United States Patent
Madhavan et al.

(10) Patent No.: US 12,536,174 B2
(45) Date of Patent: Jan. 27, 2026

(54) KNOWLEDGE GRAPH CONSTRUCTION VIA GENERATIVE ARTIFICIAL INTELLIGENCE

(71) Applicant: GE Precision Healthcare LLC, Waukesha, WI (US)

(72) Inventors: Sridhar Madhavan, Barrington, IL (US); Rama Krishna Reddy Narayana Reddy Gari, Brookfield, WI (US); Mathews Matson Chavarukattil, Bengaluru (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 0 days.

(21) Appl. No.: 18/422,591

(22) Filed: Jan. 25, 2024

(65) Prior Publication Data
US 2025/0245226 A1    Jul. 31, 2025

(51) Int. Cl.
*G06F 16/2455* (2019.01)
*G06N 5/02* (2023.01)

(52) U.S. Cl.
CPC ........... *G06F 16/2455* (2019.01); *G06N 5/02* (2013.01)

(58) Field of Classification Search
CPC .............................. G06N 5/02; G06F 16/2455
(Continued)

(56) References Cited

U.S. PATENT DOCUMENTS 7,949,444 B2    5/2011    Mukherjee
8,055,887 B2    11/2011   Karstens
(Continued)

FOREIGN PATENT DOCUMENTS

CN    105913355 A    8/2016
CN    108231145 A    6/2018
(Continued)

OTHER PUBLICATIONS

Yang, Rui et al. "Graphusion: A RAG Framework for Scientific Knowledge Graph Construction with a Global Perspective". Published Feb. 3, 2025. Accessed Sep. 29, 2025 from <https://arxiv.org/pdf/2410.17600> (Year: 2025).*

(Continued)

*Primary Examiner* — Robert W Beausoliel, Jr.
*Assistant Examiner* — Lauren Zannah Ganger
(74) *Attorney, Agent, or Firm* — Amin, Turocy & Watson, LLP

(57) ABSTRACT

Systems or techniques that facilitate knowledge graph construction via generative artificial intelligence are provided. In various embodiments, a system can access a plurality of electronic documents associated with design or fabrication of a medical imaging scanner. In various aspects, the system can construct a knowledge graph representing the plurality of electronic documents, by iteratively executing a generative text-to-text neural network on a design discovery tree associated with the medical imaging scanner. In various instances, the system can access a natural language query regarding the medical imaging scanner and can convert, via execution of another neural network, the natural language query to a structured query. In various cases, the system can execute the structured query over the knowledge graph, thereby yielding an electronic answer to the natural language query.

24 Claims, 22 Drawing Sheets

(58) Field of Classification Search
USPC .......................................................... 707/769
See application file for complete search history.

(56) References Cited

U.S. PATENT DOCUMENTS

| | | | |
|---|---|---|---|
| 8,407,158 | B2 | 3/2013 | Suri et al. |
| 8,738,663 | B2 | 5/2014 | Gonzalez et al. |
| 8,746,548 | B2 | 6/2014 | Terwilliger et al. |
| 9,183,603 | B2 | 11/2015 | Borges et al. |
| 9,396,037 | B2 | 7/2016 | Morsi et al. |
| 9,536,044 | B2 | 1/2017 | White et al. |
| 9,672,458 | B2 | 6/2017 | Burkhart et al. |
| 9,734,448 | B2 | 8/2017 | Bolich et al. |
| 10,025,791 | B2 | 7/2018 | Lee |
| 10,402,781 | B2 | 9/2019 | Terwilliger et al. |
| 10,638,999 | B2 | 5/2020 | Shah |
| 10,789,264 | B2 | 9/2020 | Crabtree et al. |
| 10,810,390 | B2 | 10/2020 | Hegendoerfer et al. |
| 10,901,834 | B2 | 1/2021 | Abhinav et al. |
| 10,902,232 | B2 | 1/2021 | Peng |
| 10,949,440 | B2 | 3/2021 | Schoueri et al. |
| 11,087,878 | B2 | 8/2021 | Vesto et al. |
| 11,240,181 | B1 | 2/2022 | Nagaraja et al. |
| 11,309,060 | B2 | 4/2022 | Janevski et al. |
| 11,321,338 | B2 | 5/2022 | Okorafor et al. |
| 11,327,989 | B2 | 5/2022 | Wu et al. |
| 11,481,738 | B2 | 10/2022 | Tong et al. |
| 11,599,729 | B2 | 3/2023 | Wu |
| 11,842,188 | B2 | 12/2023 | Bregman et al. |
| 2010/0274750 | A1 | 10/2010 | Oltean et al. |
| 2013/0087609 | A1 | 4/2013 | Nichol et al. |
| 2015/0302176 | A1 | 10/2015 | Lyons et al. |
| 2019/0019090 | A1 | 1/2019 | Chacko et al. |
| 2019/0370671 | A1 | 12/2019 | Martinez Canedo et al. |
| 2020/0365262 | A1 | 11/2020 | Sreenivasan et al. |
| 2020/0380076 | A1 | 12/2020 | Taylor |
| 2021/0064932 | A1 | 3/2021 | Wang et al. |
| 2021/0241897 | A1 | 8/2021 | Casse et al. |
| 2022/0005083 | A1 | 1/2022 | Patterson et al. |
| 2022/0189618 | A1 | 6/2022 | Klassen et al. |
| 2022/0293246 | A1 | 9/2022 | Tweedie et al. |
| 2022/0374300 | A1 | 11/2022 | Che et al. |
| 2023/0034748 | A1 | 2/2023 | Bull et al. |
| 2023/0168895 | A1 | 6/2023 | Shah et al. |
| 2023/0238103 | A1 | 7/2023 | Murphy et al. |
| 2023/0259821 | A1 | 8/2023 | Travalini et al. |
| 2023/0335236 | A1 | 10/2023 | Dambman et al. |
| 2023/0335238 | A1 | 10/2023 | Danckwardt |
| 2024/0296352 | A1* | 9/2024 | Yanosy, Jr. .............. G06N 5/02 |

FOREIGN PATENT DOCUMENTS

| | | |
|---|---|---|
| CN | 110035303 A | 7/2019 |
| CN | 111899852 A | 11/2020 |
| CN | 112364148 A | 2/2021 |
| CN | 114118062 A | 3/2022 |
| CN | 112732934 B | 5/2022 |
| CN | 114882979 A | 8/2022 |
| CN | 114898848 A | 8/2022 |
| CN | 115098673 A | 9/2022 |
| CN | 115964460 A | 4/2023 |
| CN | 114446423 B | 6/2023 |
| WO | 2020167316 A1 | 8/2020 |
| WO | 2022229088 A1 | 11/2022 |
| WO | 2023088983 A1 | 5/2023 |

OTHER PUBLICATIONS

Maguire et al., "A Metadata-Based Architecture for User-Centered Data Accountability", Electron Markets, Online available at https://link.springer.com/article/10.1007/s12525-015-0184-z, vol. 25, 2015, pp. 155-160.

Chavarukattil et al., "Generative Artificial Intelligence Driven Self-healing Agent For Medical Devices", U.S. Appl. No. 18/749,679, filed Jun. 21, 2024, 37 pages.

Deloitte | "Tech Trends 2021." Delotte Insights, https://www2.deloitte.com/content/dam/insights/articles/7023_TT-machine-data-revolution-feeding-the-machine/DI_2021-TT-machine-data-revolution.pdf, last accessed Nov. 2, 2023, 21 pages.

Anadiotis, G. | "5 technology trends for the roaring 20s, part 2: AI, Knowledge Graphs, infinity and beyond." On-line publication on ZD NET, https://www.zdnet.com/article/5-technology-trends-for-the-roaring-20s-part-2-ai-knowledge-graphs-infinity-and-beyond/, Jan. 16, 2020, 9 pages.

McMahan, B. et al. | "Federated Learning: Collaborative Machine Learning without Centralized Training Data." Google Blog https://ai.googleblog.com/2017/04/federated-learning-collaborative.html, published Apr. 6, 2017, 5 pages.

TensorFlow | "TensorFlow Federated: Machine Learning on Decentralized Data." On-line publication https://www.tensorflow.org/federated, last accessed Aug. 28, 2023, 4 pages.

schema.org | Company website https://schema.org/, last accessed Aug. 28, 2023, 1 page.

schema.org | "IoT and Schema.org: Getting Started." https://schema.org/docs/iot-gettingstarted.html, last accessed Sep. 19, 2023, 15 pages.

EP application 24223913.5 filed Dec. 31, 2024—extended Search Report issued May 20, 2025; 10 pages.

Salvatore Carta et al: "Iterative Zero-Shot LLM Prompting for Knowledge Graph Construction", arxiv.org, Cornell University Library, 201 Olin Library Cornell University Ithaca, NY 14853, XP091553715.

* cited by examiner

WHEN THE TEXTUAL PROMPT 302 IS BEING CONSIDERED BY THE GRAPH COMPONENT 114

WHEN THE TEXTUAL PROMPT 302 IS BEING CONSIDERED BY THE GRAPH COMPONENT 114

WHEN THE TEXTUAL PROMPT 308 IS BEING CONSIDERED BY THE GRAPH COMPONENT 114

WHEN THE TEXTUAL PROMPT 308 IS BEING CONSIDERED BY THE GRAPH COMPONENT 114

── 1200

WHEN THE TEXTUAL PROMPT 308 IS BEING CONSIDERED BY THE GRAPH COMPONENT 114, AND IF THE SYNTHESIZED TEXTUAL CONTENT 602 INCLUDES $T$ DISTINCT ENTITIES

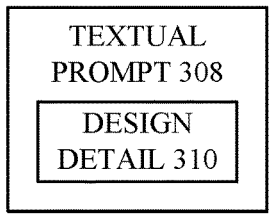

CAN CONTAIN A VARIABLE TEXT FIELD INTO WHICH EACH OF THE $T$ DISTINCT ENTITIES CAN BE SEPARATELY INSERTED, SO THAT RELEVANCY SEARCHING AND NODE CONTENT SYNTHESIS WITH RESPECT TO THE TEXTUAL PROMPT 314 CAN BE SEPARATELY PERFORMED FOR EACH OF THE $T$ DISTINCT ENTITIES

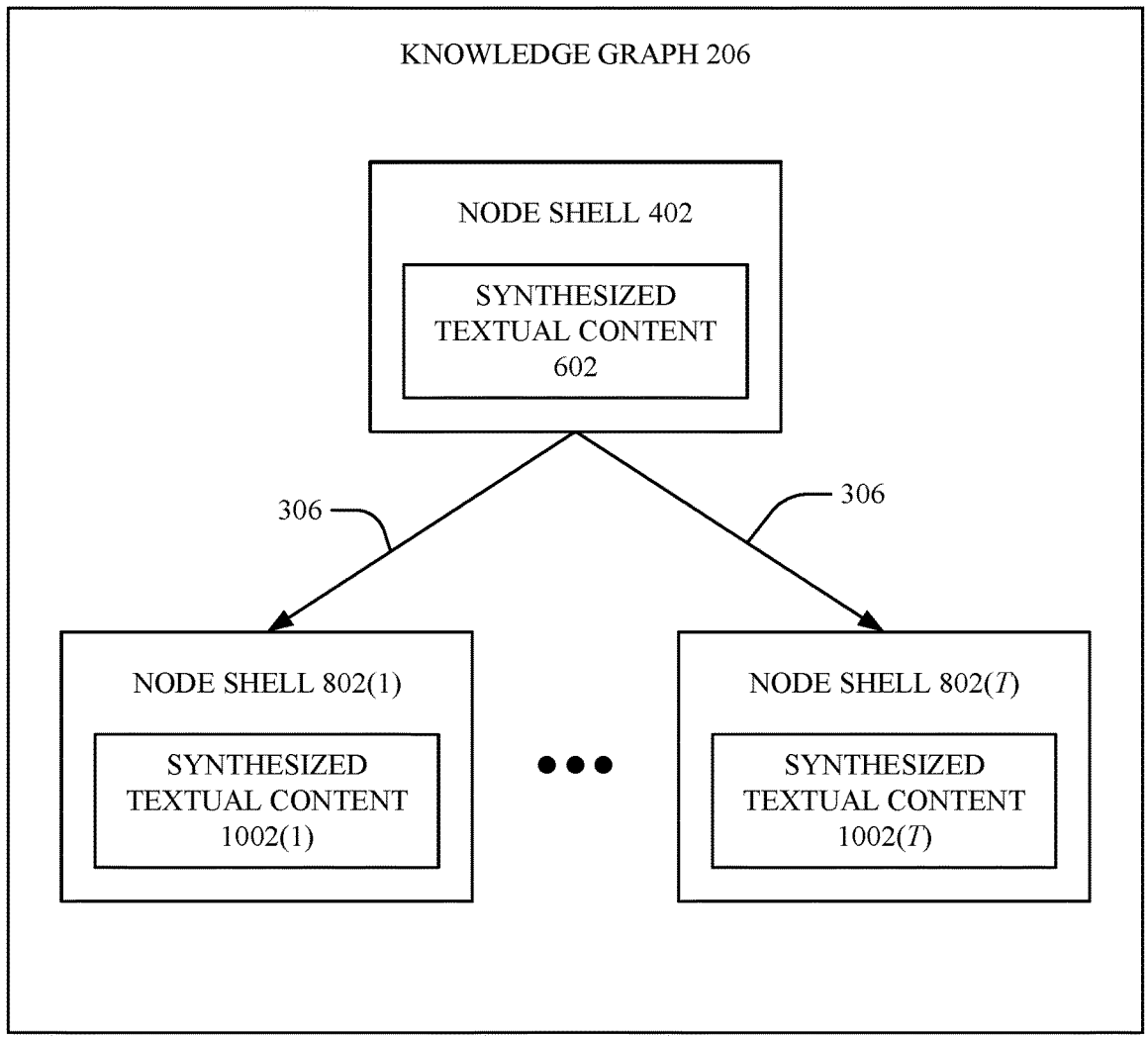

FIG. 12

KNOWLEDGE GRAPH CONSTRUCTION VIA GENERATIVE ARTIFICIAL INTELLIGENCE

TECHNICAL FIELD

The subject disclosure relates generally to knowledge graphs, and more specifically to knowledge graph construction via generative artificial intelligence.

BACKGROUND

A medical imaging scanner can be deployed in the field. During deployment, the medical imaging scanner can malfunction. A user or operator of the medical imaging scanner can determine a cause of or a way to troubleshoot such malfunction by consulting a knowledge graph that corresponds to the medical imaging scanner. Unfortunately, existing techniques for constructing such knowledge graphs are domain-specific and thus cannot be easily implemented across different domains.

Accordingly, systems or techniques that can address one or more of these technical problems can be desirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate knowledge graph construction via generative artificial intelligence are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a plurality of electronic documents associated with design or fabrication of a medical imaging scanner. In various aspects, the computer-executable components can comprise a graph component that can construct a knowledge graph representing the plurality of electronic documents, by iteratively executing a generative text-to-text neural network on a design discovery tree associated with the medical imaging scanner. In various instances, the access component can access a natural language query regarding the medical imaging scanner, and the computer-executable components can comprise a query component that can convert, via execution of another neural network, the natural language query to a structured query and that can execute the structured query over the knowledge graph, thereby yielding an electronic answer to the natural language query.

According to one or more embodiments, a computer-implemented method is provided. In various embodiments, the computer-implemented method can comprise accessing, by a device operatively coupled to a processor, a plurality of electronic documents associated with design or fabrication of a medical imaging scanner. In various aspects, the computer-implemented method can comprise constructing, by the device, a knowledge graph representing the plurality of electronic documents, by iteratively executing a generative text-to-text neural network on a design discovery tree associated with the medical imaging scanner. In various instances, the computer-implemented method can comprise accessing, by the device, a natural language query regarding the medical imaging scanner. In various cases, the computer-implemented method can comprise converting, by the device and via execution of another neural network, the natural language query to a structured query. In various aspects, the computer-implemented method can comprise executing, by the device, the structured query over the knowledge graph, thereby yielding an electronic answer to the natural language query.

According to one or more embodiments, a computer program product for facilitating knowledge graph construction via generative artificial intelligence is provided. In various embodiments, the computer program product can comprise a non-transitory computer-readable memory having program instructions embodied therewith. In various aspects, the program instructions can be executable by a processor to cause the processor to access a plurality of electronic documents associated with design or fabrication of a machine. In various instances, the program instructions can be further executable by the processor to cause the processor to construct a knowledge graph representing the plurality of electronic documents, by iteratively executing a generative text-to-text neural network on a design discovery tree associated with the machine. In various cases, the program instructions can be further executable by the processor to cause the processor to access a natural language query regarding the machine and to convert, via execution of another neural network, the natural language query to a structured query. In various aspects, the program instructions can be further executable by the processor to cause the processor to execute the structured query over the knowledge graph, thereby yielding an electronic answer to the natural language query.

DESCRIPTION OF THE DRAWINGS

FIGS. 4-12 illustrate example, non-limiting block diagrams showing how a knowledge graph can be constructed via generative artificial intelligence in accordance with one or more embodiments described herein.

DETAILED DESCRIPTION

Figure 1:
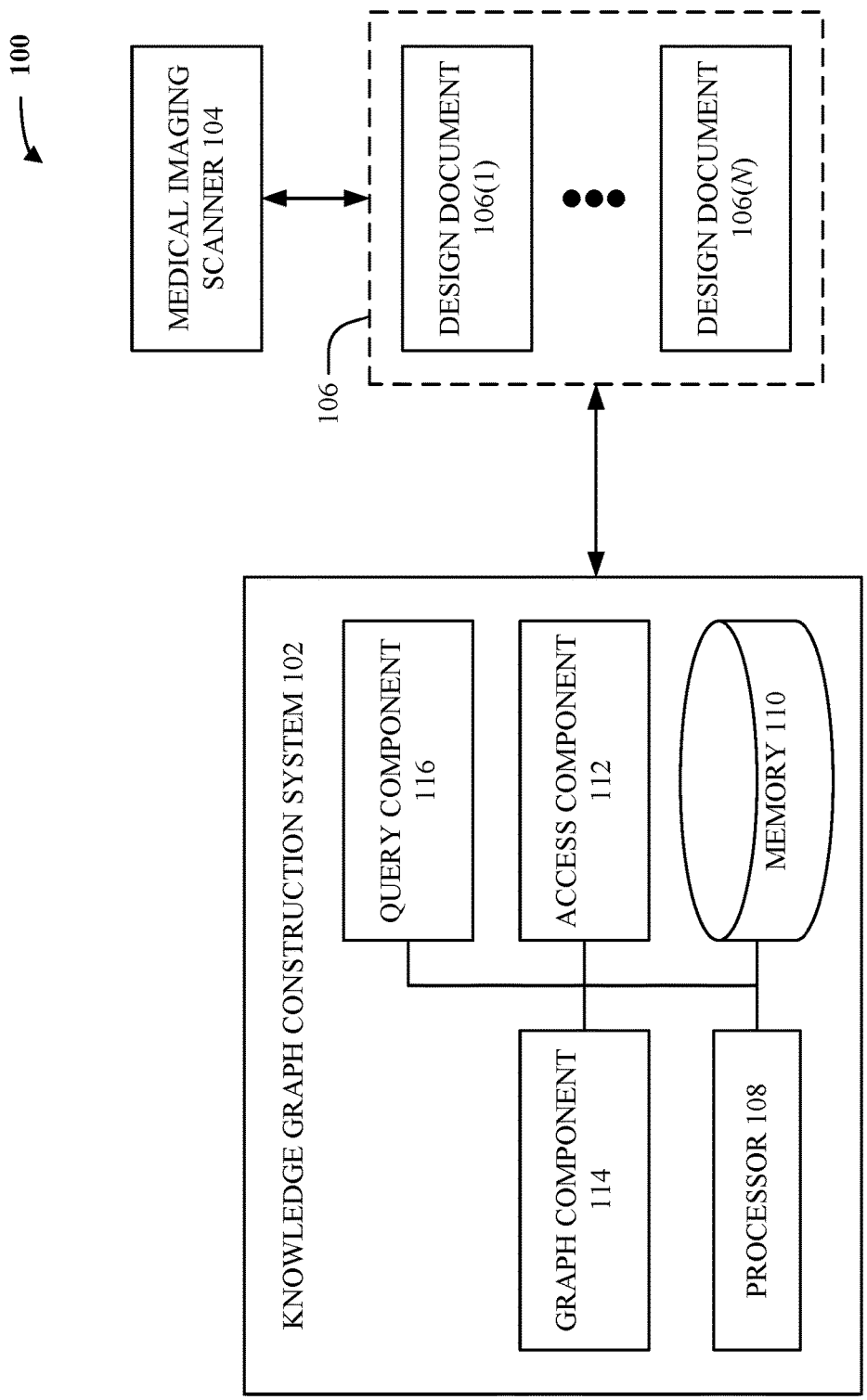
FIG. 1 illustrates a block diagram of an example, non-limiting system that facilitates knowledge graph construction via generative artificial intelligence in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A medical imaging scanner (e.g., a computed tomography (CT) scanner, a magnetic resonance imaging (MRI) scanner, an X-ray scanner, an ultrasound scanner, a positron emission tomography (PET) scanner, a nuclear medicine (NM) scanner) can be deployed in the field. Accordingly, the medical imaging scanner can capture or generate real-world medical scanned images (e.g., CT scanned images, MRI scanned images, X-ray scanned images, ultrasound scanned images, PET scanned images, NM scanned images) of real-world medical patients (e.g., humans, animals, or otherwise).

During deployment, the medical imaging scanner can malfunction. For instance, the medical imaging scanner can experience a hardware failure or a software failure that impedes or prevents the medical imaging scanner from properly capturing or generating medical scanned images (e.g., the medical scanned images can be marred or afflicted with artifacts, such as blurs or distortions).

A user or operator of the medical imaging scanner can determine a cause of or a way to troubleshoot such malfunction by consulting a knowledge graph that corresponds to the medical imaging scanner. The knowledge graph can be a graph data structure having nodes and edges, where nodes represent respective technical features of the medical imaging scanner, and where edges represent respective relations between nodes. A structured query concerning the medical imaging scanner can be answered by being executed over the knowledge graph. Such execution can be conducted in any suitable fashion, such as via SQL (acronym standing for "Structured Query Language"), SPARQL (recursive acronym standing for "SPARQL Protocol And RDF Query Language"), GraphQL (partial acronym standing for "Graph Query Language"), or Cypher query language.

Various existing techniques construct such knowledge graphs via text-to-graph parsers (also known as abstract meaning representation (AMR) parsers). In particular, a text-to-graph parser is a machine learning model (e.g., a deep learning neural network) that receives textual input and that produces as output a graph data structure that semantically represents that textual input. So, when existing techniques are implemented, electronic documents that describe technical information about a medical imaging scanner are collected, and a text-to-graph parser is executed on such electronic documents, thereby yielding a knowledge graph whose nodes and edges represent the technical information of the medical imaging scanner.

Unfortunately, such existing techniques are highly domain-specific and thus cannot be easily or readily implemented across different technical domains. Indeed, in order for a text-to-graph parser to accurately generate a knowledge graph based on a collection of electronic documents, it must be extensively trained on whatever technical domain to which those electronic documents belong. But after such extensive training, which can be effort-intensive and time-consuming, the text-to-graph parser can be unable to accurately generate knowledge graphs for electronic documents belonging to other technical domains.

For example, suppose that a text-to-graph parser is trained so as to accurately create knowledge graphs based on electronic documents that pertain to CT scanners. That is, the text-to-graph parser can be considered as being specific to a CT domain. In such case, the text-to-graph parser can be unable to accurately generate knowledge graphs based on electronic documents that instead pertain to MRI scanners or PET scanners. In other words, the text-to-graph parser, having been trained on a CT domain, is not able to accurately function in an MRI domain or a PET domain. In still other words, the text-to-graph parser is not generalizable beyond the technical domain on which it was trained (at least without extensive retraining).

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate knowledge graph construction via generative artificial intelligence. In particular, the inventors of various embodiments described herein devised various techniques that enable knowledge graphs to be constructed by generative text-to-text models. A generative text-to-text model can be a machine learning model (e.g., a deep learning neural network) that can receive inputted text and that can output synthesized text that is semantically based on such inputted text. As described herein, when given a collection of electronic documents that convey technical information about a medical imaging scanner, the present inventors realized that a knowledge graph representing that collection of electronic documents can be created, by iteratively executing a generative text-to-text model on a design discovery tree associated with the medical imaging scanner. More specifically, the knowledge graph can be initially empty, and the design discovery tree can be an ordered hierarchy of defined text prompts that have known relations with each other, where each text prompt can be a semantic question (e.g., an interrogative sentence) generally or generically inquiring about some respective technical detail of the medical imaging scanner (e.g., inquiring about constituent subsystems of the medical imaging scanner, inquiring about possible error codes of a constituent subsystem, inquiring about possible diagnostic tests to address a possible error code). For any given text prompt in the design discovery tree, the generative text-to-text model can be executed on the given text prompt in retrieval-augmented-generative (RAG) fashion referencing the collection of electronic documents. Such execution can yield some synthesized textual content, which can be considered as answering the given text prompt with whatever appropriate information is conveyed or described by the collection of electronic documents. In various instances, an empty node shell representing the given text prompt can be inserted into the knowledge graph, one or more edges respectively representing whatever known relations are associated with the given text prompt can be appended to that empty node shell, and the empty node shell can be filled with the synthesized textual content. This can be repeated for each text prompt in the design discovery tree, which can cause the knowledge graph to be iteratively enlarged so that its edges represent the known relations indicated by the design discovery tree, and so that its nodes represent whatever substantive technical information from the collection of electronic documents that answers the text prompts of the design discovery tree.

Various embodiments described herein can be considered as being advantageous over existing techniques. Indeed, the present inventors realized that generative text-to-text models (e.g., such as ChatGPT) can exhibit wider or broader generalizability than text-to-graph models. In other words, a generative text-to-text model can have a higher propensity for accurately or reliably performing textual synthesis on inputted texts that belong to various different technical domains. Accordingly, a generative text-to-text model can be accurately executed across different technical domains with little or no finetuning, whereas a text-to-graph model cannot be accurately executed across different technical domains without extensive retraining. Moreover, a design discovery tree can be general enough so as to be applicable across different technical domains. But even in situations where a domain-specific design discovery tree is warranted, the creation of such a domain-specific design discovery tree can be far less time-consuming and effort-intensive than can extensively retraining a text-to-graph model. Therefore, various embodiments described herein can be considered as a more generalizable way of constructing knowledge graphs, as compared to existing techniques.

Various embodiments described herein can be considered as a computerized tool (e.g., any suitable combination of computer-executable hardware or computer-executable software) that can facilitate knowledge graph construction via generative artificial intelligence. In various aspects, such computerized tool can comprise an access component, a graph component, or a query component.

In various embodiments, there can be a medical imaging scanner. In various aspects, the medical imaging scanner can be any suitable type of medical image-capture equipment or modality (e.g., a CT scanner, an MRI scanner, an X-ray scanner, an ultrasound scanner, or a PET scanner, an NM scanner, among others). In various instances, the medical imaging scanner can be deployed in any suitable clinical or operational context (e.g., in a hospital, in a veterinary clinic, on an emergency vehicle). In various cases, the medical imaging scanner can comprise any suitable human-computer interface device (e.g., keyboard, keypad, touchscreen, voice command system).

In various embodiments, the medical imaging scanner can be associated with a plurality of design documents. In various aspects, each of the plurality of design documents can be any suitable electronic file that textually (or, in some cases, graphically or numerically) describes or otherwise indicates any suitable information pertaining to the technical design or fabrication of the medical imaging scanner (e.g., a service manual or handbook, a bill of materials, a set of fabrication instructions, a blueprint or schematic, a failure mode analysis report). In various instances, any of the plurality of design documents can be or have been written (e.g., via any suitable word processing software, computer-aided design software, or quantitative analysis software) by technicians or engineers who were tasked with designing, developing, prototyping, revising, or manufacturing the medical imaging scanner.

In any case, it can be desired to generate a knowledge graph that represents the plurality of design documents. As described herein, the computerized tool can facilitate such knowledge graph generation.

In various embodiments, the access component of the computerized tool can electronically access the plurality of design documents. For instance, the access component can electronically retrieve or obtain the plurality of design documents from any suitable centralized or decentralized databases, whether remote from or local to the access component. In any case, the access component can electronically access the plurality of design documents, such that other components of the computerized tool can electronically interact with (e.g., read, write, edit, copy, manipulate) the plurality of design documents.

In various embodiments, the graph component of the computerized tool can electronically store, maintain, control, or otherwise access a first deep learning neural network. In various aspects, the first deep learning neural network can exhibit any suitable internal architecture. For example, the first deep learning neural network can include any suitable numbers of any suitable types of layers (e.g., input layer, one or more hidden layers, output layer, any of which can be convolutional layers, dense layers, long short-term memory (LSTM) layers, non-linearity layers, pooling layers, batch normalization layers, or padding layers). As another example, the first deep learning neural network can include any suitable numbers of neurons in various layers (e.g., different layers can have the same or different numbers of neurons as each other). As yet another example, the first deep learning neural network can include any suitable activation functions (e.g., softmax, sigmoid, hyperbolic tangent, rectified linear unit) in various neurons (e.g., different neurons can have the same or different activation functions as each other). As still another example, the first deep learning neural network can include any suitable interneuron connections or interlayer connections (e.g., forward connections, skip connections, recurrent connections).

Regardless of its specific internal architecture, the first deep learning neural network can be configured as a generative text-to-text model. That is, the first deep learning neural network can be configured to receive as input any suitable textual data (which, in various cases, may or may not be accompanied by any suitable numerical data or any suitable graphical data), and the first deep learning neural network can be configured to produce as output synthesized textual content (e.g., one or more synthesized sentences or sentence fragments) that is semantically or substantively based on such inputted textual data (and based on accompanying numerical or graphical data, as appropriate).

Now, in various aspects, the graph component can electronically store, maintain, control, or otherwise access a design discovery tree that is associated with the medical imaging scanner. In various instances, the design discovery tree can be a hierarchy of textual prompts that have known semantic relationships with each other. In various cases, each textual prompt in the design discovery tree can be a natural language question that asks about a respective technical detail, feature, part, operation, or other hardware-based or software-based aspect of the medical imaging scanner. In various instances, a textual prompt can contain a variable text field that is configured or intended to be filled with the specific name or identifier of the medical imaging scanner or any portion thereof, or with the specific name or identifier of an event that can occur with respect to, be implemented by, or otherwise affect the medical imaging scanner or any portion thereof.

As a non-limiting example, a first textual prompt in the design discovery tree can ask "What are all the subsystems of [insert scanner identifier here]?". As another non-limiting example, the first textual prompt can have a "has-component" relation with a second textual prompt, and the second textual prompt can ask "What are all the constituent components of [insert subsystem identifier here]?". As yet another non-limiting example, the second textual prompt can have a "has-error" relation with a third textual prompt, and the third textual prompt can ask "What are all the possible errors codes of [insert component identifier here]?". As even another non-limiting example, the second textual prompt can have a "has-sensor" relation with a fourth textual prompt, and the fourth textual prompt can ask "What are all the sensors of [insert component identifier here]?". As still another non-limiting example, the second textual prompt can have a "has-fault" relation with a fifth textual prompt, and the fifth textual prompt can ask "What are all the possible fault modes of [insert component identifier here]?". As another non-limiting example, the fifth textual prompt can have a "has-cause" relation with a sixth textual prompt, and the sixth textual prompt can ask "What are all the possible causes of [insert fault mode identifier here]?".

In any case, the graph component can electronically generate a knowledge graph that represents the plurality of design documents, by iteratively executing the first deep learning neural network on the design discovery tree. In various aspects, such execution can be facilitated in RAG-fashion, and the plurality of design documents can serve as RAG references or RAG context during such execution.

More specifically, the knowledge graph can be initially empty (e.g., can have no nodes and no edges). In various instances, the graph component can sequentially iterate through the textual prompts of the design discovery tree, beginning with a most-upstream textual prompt and proceeding in order of relation hierarchy until all textual prompts in the design discovery tree are utilized.

In some cases, before beginning such sequential iteration, the graph component can already know (e.g., due to being informed by a user, operator, or technician via a human-computer interface device) a specific name or identifier of the medical imaging scanner. In various aspects, the graph component can modify the design discovery tree by inserting the specific name or identifier of the medical imaging scanner into whatever variable text fields of the design discovery tree are configured or intended for the specific name or identifier of the medical imaging scanner.

Now, for any given textual prompt that is being considered by the graph component, the graph component can insert an empty node shell into the knowledge graph. If the given textual prompt has known relations to any other textual prompts in the design discovery tree that have already been considered by the graph component (this will not occur for the very first textual prompt considered by the graph component), then the graph component can insert into the knowledge graph, between the empty node shell and whatever nodes already in the knowledge graph that respectively represent those already-considered textual prompts, edges respectively representing those known relations.

In various aspects, the graph component can search through the plurality of design documents, so as to identify one or more design documents that are substantively relevant, related, or applicable to the given textual prompt. In various aspects, the graph component can facilitate such searching via any suitable document search techniques (e.g., keyword-based document search techniques, embedding-based document search techniques, probabilistic retrieval-based document search techniques). In various instances, a design document can be considered as being relevant, related, or applicable to the given textual prompt if the substantive content of that design document pertains in some way to whatever semantic question is asked by the given textual prompt.

As a non-limiting example, suppose that the given textual prompt asks about a particular subsystem of the medical imaging scanner. In such case, any service manual paragraph, page, or chapter that describes that particular subsystem can be considered as being relevant, related, or applicable to the given textual prompt.

As another non-limiting example, suppose that the given textual prompt instead asks about a particular failure mode of the medical imaging scanner. In such case, any failure report paragraph, page, or chapter that describes that particular error mode can be considered as being relevant, related, or applicable to the given textual prompt.

In various aspects, the graph component can execute the first deep learning neural network on the given textual prompt and on the one or more relevant design documents, and such execution can cause the first deep learning neural network to produce synthesized textual content. More specifically, the graph component can concatenate the given textual prompt and the one or more relevant design documents together, and the graph component can feed such concatenation to an input layer of the first deep learning neural network. In various cases, that concatenation can complete a forward pass through one or more hidden layers of the first deep learning neural network. In various instances, such forward pass can cause an output layer of the first deep learning neural network to compute the synthesized textual content, based on activations provided by the one or more hidden layers.

In any case, the synthesized textual content can be any suitable string of natural language text that can semantically or substantively answer the question asked by the given textual prompt. As a non-limiting example, suppose that the given textual prompt asks for identification of all the subsystems of the medical imaging scanners. In such case, the synthesized textual content can be one or more sentences or sentence fragments that explicitly identify or name those subsystems. As another non-limiting example, suppose that the given textual prompt asks for identification of all the possible causes of a particular fault mode of the medical imaging scanners. In such case, the synthesized textual content can be one or more sentences or sentence fragments that explicitly identify or name those causes.

In various aspects, the graph component can fill the empty node shell with that synthesized textual content. Accordingly, that node shell can be considered as no longer being empty.

In various instances, the graph component can determine whether the synthesized textual content answers the given textual prompt by identifying, naming, or otherwise calling-out multiple discrete entities that are associated with the medical imaging scanner (e.g., multiple constituent parts of the medical imaging scanner, multiple functionalities that can be implemented by the medical imaging scanner, multiple events that can occur with respect to the medical imaging scanner). In various cases, the graph component can facilitate such determination via any suitable named-entity recognition (NER) techniques (e.g., statistical NER, rule-based NER, transformer-based NER). If so, the graph component can further modify the design discovery tree by: making, for each discrete entity in the synthesized textual content, a respective copy of whatever branches of the design discovery tree are downstream of the given textual prompt; and inserting a name or identifier of that discrete entity into appropriate variable text fields in that respective copy.

As a non-limiting example, suppose that the given textual prompt asks for explicit identification of all subsystems of the medical imaging scanner. Furthermore, suppose that the given textual prompt has a "has-failure" relation with another text prompt and that the another text prompt asks "What are all the possible failure modes of [insert subsystem identifier here]?". Further still, suppose that the synthesized textual content states "The medical imaging scanner has a gantry subsystem, an X-ray tube subsystem, patient-table subsystem, and a detector subsystem." In such case, the graph component can determine, via NER, that the synthesized textual content answers the given textual prompt by explicitly calling-out four discrete entities: the gantry subsystem; the X-ray tube subsystem; the patient-table subsystem; and the detector subsystem. Accordingly, the graph component can make a respective copy of the another textual prompt (as well as of all other textual prompts that are downstream of the another textual prompt) for each of those four discrete entities. This can cause the design discovery tree to now have the following: a first copy or version of the another textual prompt that asks "What are all the possible failure modes of the gantry subsystem?"; a second copy or version of the another textual prompt that asks "What are all the possible failure modes of the X-ray tube subsystem?"; a third copy or version of the another textual prompt that asks "What are all the possible failure modes of the patient-table subsystem?"; and a fourth copy or version of the another textual prompt that asks "What are all the possible failure modes of the detector subsystem?".

At this point, the graph component can be considered as being finished with the given textual prompt and can accordingly iterate to a next textual prompt in the design discovery tree.

In this way, the graph component can incrementally add to or otherwise enlarge the knowledge graph one node at a time, by iteratively executing the first deep learning neural network on the design discovery tree. After all nodes of the design discovery tree are considered by the graph component, the knowledge graph can be considered as being complete or finished.

Note that, in various instances, it can be possible for technicians or engineers to add new textual prompts to the design discovery tree or to add edits or altogether new files to the plurality of design documents. Indeed, such new textual prompts, edits, or new files can result from ongoing research and development conducted by the technicians or engineers. In such cases, the graph component can iterate through the design discovery tree (or any suitable portion thereof) again, thereby keeping the knowledge graph up-to-date with the research and development efforts of the technicians or engineers.

In any case, the knowledge graph can substantively or semantically represent various technical details or features of the medical imaging scanner that are described or conveyed by the plurality of design documents, and the graph component can generate the knowledge graph by iteratively executing the first deep learning neural network in RAG-fashion on the design discovery tree.

In various embodiments, the access component can electronically receive, retrieve, or otherwise access, from any suitable source, a natural language query. In various aspects, the natural language query can be a plain text interrogative sentence that asks some substantive question about any suitable technical features, components, or malfunction symptoms of the medical imaging scanner 104. In various instances, the natural language query can be provided by a user or operator of the medical imaging scanner via any suitable human-computer interface device (e.g., keyboard, keypad, touchscreen, voice command).

In various cases, the query component can electronically store, maintain, control, or otherwise access a second deep learning neural network. In various aspects, the second deep learning neural network can exhibit any suitable internal architecture. For example, the second deep learning neural network can include any suitable numbers of any suitable types of layers (e.g., input layer, one or more hidden layers, output layer, any of which can be convolutional layers, dense layers, LSTM layers, non-linearity layers, pooling layers, batch normalization layers, or padding layers). As another example, the second deep learning neural network can include any suitable numbers of neurons in various layers (e.g., different layers can have the same or different numbers of neurons as each other). As yet another example, the second deep learning neural network can include any suitable activation functions (e.g., softmax, sigmoid, hyperbolic tangent, rectified linear unit) in various neurons (e.g., different neurons can have the same or different activation functions as each other). As still another example, the second deep learning neural network can include any suitable interneuron connections or interlayer connections (e.g., forward connections, skip connections, recurrent connections).

Regardless of its specific internal architecture, the second deep learning neural network can be configured to convert unstructured textual queries to structured textual queries. Accordingly, the query component can execute the second deep learning neural network on the natural language query, and such execution can cause the second deep learning neural network to produce as output a structured query. More specifically, the query component can feed the natural language query to an input layer of the second deep learning neural network, the natural language query can complete a forward pass through one or more hidden layers of the second deep learning neural network, and an output layer of the second deep learning neural network can compute the structured query based on activations provided by the one or more hidden layers of the second deep learning neural network. In any case, the structured query can be considered as a substantive or semantic version of the natural language query that exhibits a defined or standardized format (e.g., a SQL format, a Cypher format).

In various aspects, the query component can identify an electronic answer or response for the natural language question, by executing the structured query over the knowledge graph. In various instances, this can be facilitated by any suitable graph querying technique (e.g., facilitated by SQL, SPARQL, GraphQL, or Cypher). In some cases, the query component can visually render the electronic answer or response on any suitable computer screen or monitor that is visible to the user or operator that asked the natural language query. In other cases, the query component can transmit the electronic answer or response to any suitable computing device that is associated with the user or operator that asked the natural language query. In any case, the query component can be considered as informing the user or operator of the electronic answer or response.

Note that, in order for the knowledge graph and the electronic answer or response described herein to be accurate or reliable, the first and second deep learning neural networks should undergo training. Accordingly, the computerized tool described herein can comprise a training component that can facilitate such training in any suitable fashion (e.g., supervised fashion, unsupervised fashion, reinforcement learning fashion).

Various embodiments described herein can be employed to use hardware or software to solve problems that are highly technical in nature (e.g., to facilitate knowledge graph construction via generative artificial intelligence), that are not abstract and that cannot be performed as a set of mental acts by a human. Further, some of the processes performed can be performed by a specialized computer (e.g., deep learning neural networks executed on design discovery trees) for carrying out defined acts related to knowledge graphs. For example, such defined acts can include: accessing, by a device operatively coupled to a processor, a plurality of electronic documents associated with design or fabrication of a medical imaging scanner; and constructing, by the device, a knowledge graph representing the plurality of electronic documents, by iteratively executing a generative text-to-text neural network on a design discovery tree associated with the medical imaging scanner. Furthermore, such defined acts can include accessing, by the device, a natural language query regarding the medical imaging scanner; converting, by the device and via execution of another neural network, the natural language query to a structured query; and executing, by the device, the structured query over the knowledge graph, thereby yielding an electronic answer to the natural language query. Further still, each element of the design discovery tree can be a textual prompt requesting identification of a respective technical design detail of the medical imaging scanner, the textual prompt can have a known relation to another textual prompt of the design discovery tree, and the defined acts can further include: inserting, by the device, a node shell into the knowledge graph; appending, by the device, an instantiation of the known relation to the node shell; and filling, by the device, the node shell by executing the generative text-to-text neural network on the textual prompt in RAG fashion where the plurality of design documents are treated as RAG references or RAG context.

Such defined acts are not performed manually by humans. Indeed, neither the human mind nor a human with pen and paper can: electronically create a knowledge graph to represent technical information of a medical imaging scanner, by iteratively executing a generative text-to-text neural network in RAG fashion on a design discovery tree; and electronically answer a natural language query asking about the medical imaging scanner by converting, via another neural network, the natural language query into a structured query and executing that structured query over the knowledge graph. Indeed, medical imaging scanners, deep learning neural networks, knowledge graphs, and structured queries are all inherently-computerized, hardware-based, or software-based constructs that simply cannot be meaningfully implemented, trained, or executed in any way by the human mind without computers. A computerized tool that can automatically build a knowledge graph via iterative execution of a generative text-to-text neural network and that can answer questions by converting those questions to structured queries and then executing those structured queries over that knowledge graph is likewise inherently-computerized and cannot be implemented in any sensible, practical, or reasonable way without computers.

Moreover, various embodiments described herein can integrate into a practical application various teachings relating to knowledge graph construction via generative artificial intelligence. As described above, questions about a medical imaging scanner can be answered by executing appropriate queries over a knowledge graph that represents technical information about the medical imaging scanner. To facilitate this, the knowledge graph must first be built or constructed. Existing techniques build or construct knowledge graphs via text-to-graph parsers. Unfortunately, as the present inventors recognized, text-to-graph parsers can be considered as exhibiting poor generalizability across technical domains. Accordingly, existing techniques require extensive retraining every time a knowledge graph in a new technical domain is desired. Such extensive retraining can be considered as effort-intensive, time-consuming, or otherwise undesirable.

Various embodiments described herein can address one or more of these technical problems. In particular, the present inventors devised various techniques for constructing knowledge graphs via generative artificial intelligence. Specifically, the present inventors recognized that generative text-to-text models can exhibit higher generalizability than text-to-graph parsers. However, the present inventors also recognized that, prior to the teachings described herein, it was not at all clear how to construct knowledge graphs using generative text-to-text models. Indeed, generative text-to-text models synthesize plain text as output, but a knowledge graph is not plain text. Instead, a knowledge graph is a graph data structure having nodes and edges between nodes. Prior to the work of the present inventors, automatically converting synthesized plain text to such a graph data structure, without utilizing text-to-graph parsers, was a non-trivial task which the state of the art could not accomplish. Despite such non-triviality, the present inventors devised various embodiments described herein. In various aspects, when given a collection of design documents describing technical or fabrication information about a medical imaging scanner, various embodiments described herein can include generating a knowledge graph to represent the collection of design documents, by iteratively executing a generative text-to-text model on a design discovery tree associated with the medical imaging scanner. In various instances, the design discovery tree can be an ordered hierarchy of text prompts that have known semantic relations with each other. In various cases, each text prompt can be an interrogative plain text sentence that asks about some respective technical detail or feature of the medical imaging scanner. In various aspects, the knowledge graph can be initially empty, and various embodiments described herein can incrementally enlarge the knowledge graph by iterating through the design discovery tree in a top-down sequence. In particular, for any given text prompt in the design discovery tree, various embodiments described herein can insert an empty node shell (and any accompanying semantic relations) into the knowledge graph, and such embodiments can fill that empty node shell by executing a generative text-to-text model on the given text prompt. In various instances, such execution can be facilitated in RAG fashion, using the collection of design documents as references or context. Furthermore, such execution can yield synthesized textual content that substantively or semantically answers the given text prompt. Accordingly, that synthesized textual content can be inserted into the empty node shell. By iterating in this fashion through all text prompts in the design discovery tree, the knowledge graph can be incrementally constructed (e.g., one node at a time). Thus, various embodiments described herein can facilitate knowledge graph construction via generative text-to-text artificial intelligence. Because generative models can exhibit greater generalizability than text-to-graph parsers (e.g., consider ChatGPT, which can be considered as a generative text-to-text model that exhibits high performance across very many different technical domains), various embodiments described herein can be considered as an improved way of constructing knowledge graphs, as compared to existing techniques. Thus, various embodiments described herein certainly constitute a tangible and concrete technical improvement or technical advantage in the field of knowledge graphs. Accordingly, such embodiments clearly qualify as useful and practical applications of computers.

Furthermore, various embodiments described herein can control real-world tangible devices based on the disclosed teachings. For example, various embodiments described herein can electronically train and execute real-world deep learning neural networks, so as to build real-world knowledge graphs that represent technical features or fabrication information about real-world medical imaging scanners.

It should be appreciated that the herein figures and description provide non-limiting examples of various embodiments and are not necessarily drawn to scale.

FIG. 1 illustrates a block diagram of an example, non-limiting system 100 that can facilitate knowledge graph construction via generative artificial intelligence in accordance with one or more embodiments described herein. As shown, a knowledge graph construction system 102 can be electronically integrated, via any suitable wired or wireless electronic connections, with a plurality of design documents 106 that can correspond to a medical imaging scanner 104.

In various embodiments, the medical imaging scanner 104 can be any suitable device, equipment, or modality for capturing or generating medical images. As a non-limiting example, the medical imaging scanner 104 can be a CT scanner that can capture or generate CT scanned pixel arrays or voxel arrays. As another non-limiting example, the medical imaging scanner 104 can be an MRI scanner that can capture or generate MRI scanned pixel arrays or voxel arrays. As even another non-limiting example, the medical imaging scanner 104 can be an X-ray scanner that can capture or generate X-ray scanned pixel arrays or voxel arrays. As yet another non-limiting example, the medical imaging scanner 104 can be an ultrasound scanner that can capture or generate ultrasound scanned pixel arrays or voxel arrays. As still another non-limiting example, the medical imaging scanner 104 can be a PET scanner that can capture or generate PET scanned pixel arrays or voxel arrays. As another non-limiting example, the medical imaging scanner 104 can be an NM scanner that can capture or generate NM scanned pixel arrays or voxel arrays.

In various aspects, the medical imaging scanner 104 can be deployed, stationed, or otherwise implemented in any suitable clinical operational context. As a non-limiting example, the medical imaging scanner 104 can be deployed, stationed, or otherwise implemented within any suitable hospital or medical center. As another non-limiting example, the medical imaging scanner 104 can be deployed, stationed, or otherwise implemented within any suitable scientific or medical laboratory. As yet another non-limiting example, the medical imaging scanner 104 can be deployed, stationed, or otherwise implemented within any suitable veterinary center. As even another non-limiting example, the medical imaging scanner 104 can be deployed, stationed, or otherwise implemented within or onboard any suitable vehicle (e.g., ambulance, cruise ship, airplane).

In various instances, the medical imaging scanner 104 can comprise any suitable human-computer interface device by which a user or operator of the medical imaging scanner 104 can manually interact with or control the medical imaging scanner 104. As a non-limiting example, the medical imaging scanner 104 can comprise any suitable keyboard or keypad that can be pressed by the user or operator. As another non-limiting example, the medical imaging scanner 104 can comprise any suitable computer mouse that can be dragged or clicked by the user or operator. As even another non-limiting example, the medical imaging scanner 104 can comprise any suitable touchscreen that can be tactilely manipulated by the user or operator. As yet another non-limiting example, the medical imaging scanner 104 can comprise any suitable voice command system that can accept verbal instructions spoken by the user or operator.

In various cases, the plurality of design documents 106 can comprise n documents, for any suitable positive integer $n>1$: a design document 106(1) to a design document 106($n$). In various aspects, each of the plurality of design documents 106 can be any suitable electronic data (e.g., one or more scalars, one or more vectors, one or more matrices, one or more tensors, one or more character strings, or any suitable combination thereof) that can pertain in some way to the technical design or fabrication of the medical imaging scanner 104 (e.g., the design document 106(1) can be a first electronic file that pertains to the technical design or fabrication of the medical imaging scanner 104; the design document 106($n$) can be an n-th electronic file that pertains to the technical design or fabrication of the medical imaging scanner 104). In other words, each of the plurality of design documents 106 can textually, numerically, or graphically indicate, specify, convey, describe, explain, show, or otherwise represent: any suitable information regarding how the medical imaging scanner 104 is technologically or scientifically designed (e.g., can list or show different constituent pieces of the medical imaging scanner 104 and can describe how they work); any suitable information regarding how the medical imaging scanner 104 was fabricated or manufactured (e.g., can list or explain what materials the medical imaging scanner 104 is made from or what manufacturing processes were used to fabricate the medical imaging scanner 104); any suitable information regarding how the medical imaging scanner 104 functions (e.g., can list or show what different settings or parameters the medical imaging scanner 104 has and can describe how those different settings can be configured or invoked); any suitable information regarding how the medical imaging scanner 104 is expected or supposed to be used or operated (e.g., can show or explain various operating conditions or use-case scenarios that the medical imaging scanner 104 is designed to handle or is not designed to handle); or any suitable information regarding how the medical imaging scanner 104 is expected or supposed to be maintained (e.g., can list or show various servicing tasks or troubleshooting steps that can be performed by or with respect to the medical imaging scanner 104 and can describe when such servicing tasks or troubleshooting steps should be performed).

As a non-limiting example, any of the plurality of design documents 106 can be a service manual or handbook (or any paragraph, page, chapter, or other portion thereof) that is known to correspond to the medical imaging scanner 104 or to any constituent part of the medical imaging scanner 104. As another non-limiting example, any of the plurality of design documents 106 can be a bill of materials (or any paragraph, page, section, or other portion thereof) that is known to correspond to the medical imaging scanner 104 or to any constituent part of the medical imaging scanner 104. As still another non-limiting example, any of the plurality of design documents 106 can be a fabrication report or manufacturing order (or any paragraph, page, section, or other portion thereof) that is known to correspond to the medical imaging scanner 104 or to any constituent part of the medical imaging scanner 104. As even another non-limiting example, any of the plurality of design documents 106 can be a blueprint, schematic, or other image (or any page, section, or portion thereof) that is known to show the medical imaging scanner 104 or to show any constituent part of the medical imaging scanner 104. As yet another non-limiting example, any of the plurality of design documents 106 can be a design failure mode effect analysis (or any paragraph, page, section, or other portion thereof) that is known to correspond to the medical imaging scanner 104 or to any constituent part of the medical imaging scanner 104.

In various instances, any of the plurality of design documents 106 can be written or otherwise created via any suitable word processing software (e.g., Microsoft Word®), via any suitable computer-aided design software (e.g., SolidWorks®, AutoCAD®), or via any suitable quantitative analysis software (e.g., Microsoft Excel®), by technicians or engineers who were responsible for designing, developing, prototyping, testing, or manufacturing the medical imaging scanner 104.

In some aspects, any of the plurality of design documents 106 can be any suitable electronic data or file that can be created, generated, or otherwise outputted by the medical imaging scanner 104 itself. As some non-limiting examples, any of the plurality of design documents 106 can be: a pixel array, voxel array, or sinogram captured by the medical imaging scanner 104; an error report outputted by the medical imaging scanner 104; or any timeseries outputted or measured by any suitable sensors of the medical imaging scanner 104.

In any case, it can be desired to generate a knowledge graph to represent the plurality of design documents 106, so that questions regarding the medical imaging scanner 104 can be automatically answered via knowledge graph querying techniques. As described herein, the knowledge graph construction system 102 can facilitate or accomplish such objectives.

In various embodiments, the knowledge graph construction system 102 can comprise a processor 108 (e.g., computer processing unit, microprocessor) and a non-transitory computer-readable memory 110 that is operably or operatively or communicatively connected or coupled to the processor 108. The non-transitory computer-readable memory 110 can store computer-executable instructions which, upon execution by the processor 108, can cause the processor 108 or other components of the knowledge graph construction system 102 (e.g., access component 112, graph component 114, query component 116) to perform one or more acts. In various embodiments, the non-transitory computer-readable memory 110 can store computer-executable components (e.g., access component 112, graph component 114, query component 116), and the processor 108 can execute the computer-executable components.

In various embodiments, the knowledge graph construction system 102 can comprise an access component 112. In various aspects, the access component 112 can electronically access the medical imaging scanner 104 or the plurality of design documents 106. As a non-limiting example, the access component 112 can electronically communicate in any suitable fashion with the medical imaging scanner 104. That is, the access component 112 can electronically transmit any suitable electronic data to the medical imaging scanner 104, and the medical imaging scanner 104 can likewise electronically transmit any suitable electronic data to the access component 112. As another non-limiting example, the access component 112 can electronically retrieve or otherwise electronically obtain the plurality of design documents 106 from any suitable centralized or decentralized data structures (not shown) or from any suitable centralized or decentralized computing devices (not shown). Indeed, in some cases, the access component 112 can electronically receive the plurality of design documents 106 from the medical imaging scanner 104. In any case, the access component 112 can electronically access the medical imaging scanner 104 or the plurality of design documents 106, such that the access component 112 can serve as a conduit through which other components of the knowledge graph construction system 102 can electronically interact with the medical imaging scanner 104 or with the plurality of design documents 106.

In various embodiments, the knowledge graph construction system 102 can comprise a graph component 114. In various aspects, as described herein, the graph component 114 can construct a knowledge graph representing the plurality of design documents 106, by iteratively executing a generative text-to-text model on a design discovery tree associated with the medical imaging scanner 104.

In various embodiments, the knowledge graph construction system 102 can comprise a query component 116. In various instances, as described herein, the query component 116 can identify an answer for any given query regarding the medical imaging scanner 104, by leveraging the knowledge graph that is constructed by the graph component 114.

Figure 2:
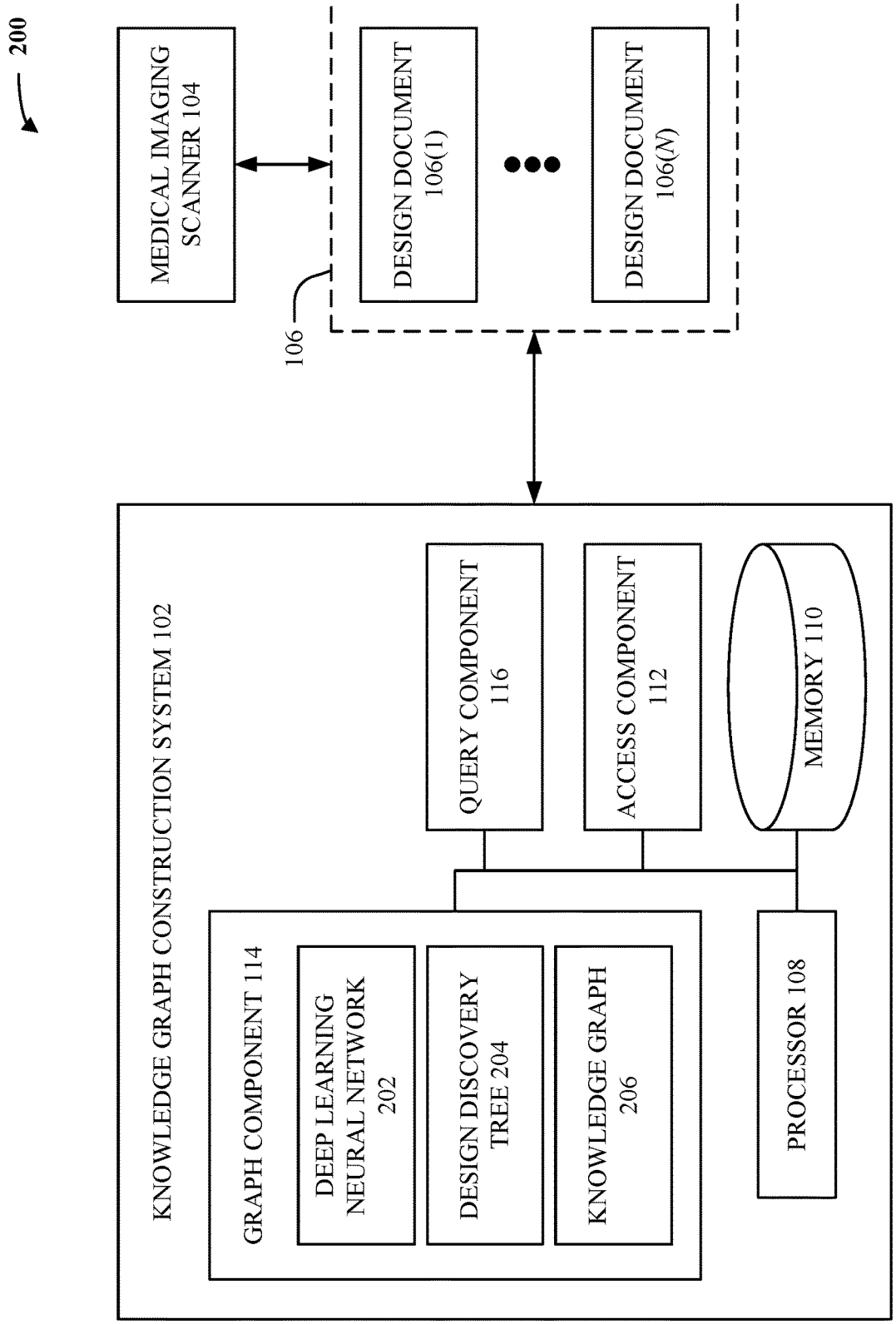
FIG. 2 illustrates a block diagram of an example, non-limiting system including a deep learning neural network, a design discovery tree, and a knowledge graph that facilitates knowledge graph construction via generative artificial intelligence in accordance with one or more embodiments described herein.

FIG. 2 illustrates a block diagram of an example, non-limiting system 200 including a deep learning neural network, a design discovery tree, and a knowledge graph that can facilitate knowledge graph construction via generative artificial intelligence in accordance with one or more embodiments described herein. As shown, the system 200 can, in some cases, comprise the same components as the system 100, and can further comprise a deep learning neural network 202, a design discovery tree 204, and a knowledge graph 206.

In various embodiments, the graph component 114 can electronically store, electronically maintain, electronically control, or otherwise electronically access the deep learning neural network 202. In various instances, the deep learning neural network 202 can have or otherwise exhibit any suitable deep learning internal architecture. For instance, the deep learning neural network 202 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of the specific internal architecture (e.g., the specific number, types, or organization of layers) implemented within the deep learning neural network 202, the deep learning neural network 202 can be configured as a generative text-to-text model. In other words, the deep learning neural network 202 can be configured to receive textual data (which can be accompanied by any suitable numerical or graphical data) as input and to produce synthesized textual data (e.g., synthesized natural language sentences or sentence fragments) as output, where such synthesized textual data is semantically or substantively based on the inputted textual data.

In various aspects, the graph component 114 can electronically store, electronically maintain, electronically control, or otherwise electronically access the design discovery tree 204. In various instances, the design discovery tree 204 can be a hierarchy of textual prompts, where such textual prompts can have known semantic relations with each other, and where each of such textual prompts can be a plain text or natural language question regarding a respective technical detail of the medical imaging scanner 104.

In various cases, the knowledge graph 206 can be any suitable graph data structure having nodes and edges, which can represent whatever technical information or fabrication information of the medical imaging scanner 104 is described or conveyed by the plurality of design documents 106. In various aspects, the graph component 114 can electronically generate, construct, or otherwise build the knowledge graph 206, by iteratively executing the deep learning neural network 202 on the design discovery tree 204, where such execution can be facilitated in RAG-fashion using the plurality of design documents 106 as references or context. Non-limiting aspects are described with respect to FIGS. 3-12.

Figure 3:
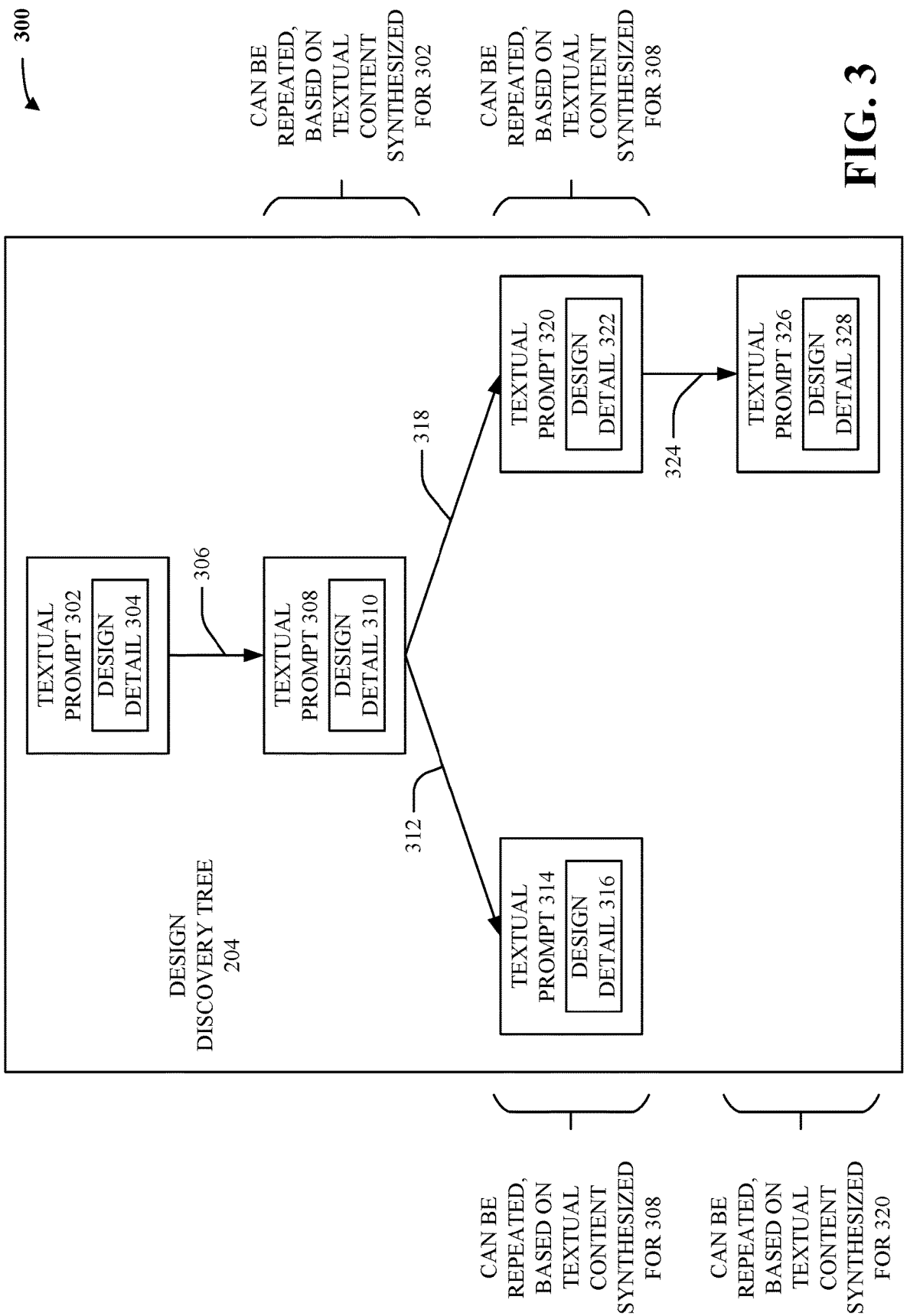
FIG. 3 illustrates an example, non-limiting block diagram of a design discovery tree in accordance with one or more embodiments described herein.

FIG. 3 illustrates an example, non-limiting block diagram 300 of the design discovery tree 204 in accordance with one or more embodiments described herein.

As mentioned above, the design discovery tree 204 can be an ordered hierarchy of textual prompts having known semantic relations with each other. In other words, the design discovery tree 204 can be considered as a directed acyclic graph whose nodes are textual prompts and whose edges are semantic relations. In various aspects, the design discovery tree 204 can comprise any suitable number of textual prompts arranged in any suitable fashion via any suitable number of semantic relations. In various instances, each textual prompt of the design discovery tree 204 can be a plain text or natural language string that requests or commands identification of a respective technical detail of the medical imaging scanner 104. Non-limiting examples of such technical details can include: constituent hardware or software components that make up the medical imaging scanner 104; functionalities performable by such constituent hardware or software components; possible error codes that are able to be outputted or thrown by the medical imaging scanner 104 or any portion thereof; possible measurements that are able to be captured or measured by sensors of the medical imaging scanner 104 or any portion thereof; possible diagnostic tools that are able to be implemented by or with respect to the medical imaging scanner 104 or any suitable portion thereof; possible failure modes that are able to be experienced by the medical imaging scanner 104 or any portion thereof; or possible causes of such failure modes. Because the design discovery tree 204 can be a directed acyclic graph, the design discovery tree 204 can be considered as having one most-upstream textual prompt, such that all other textual prompts of the design discovery tree 204 are downstream of (e.g., branch off directly or indirectly from) that most-upstream textual prompt. Moreover, any textual prompt of the design discovery tree can contain variable text fields into which names or identifiers of the medical imaging scanner 104, of any portion of the medical imaging scanner 104, or of any event, functionality, or other entity associated with the medical imaging scanner 104 can be inserted. In particular, the most-upstream textual prompt (also referred to as the root textual prompt) of the design discovery tree 204 can contain a variable text field that is configured or intended to be filled with the specific name or identifier of the medical imaging scanner 104. In contrast, any given textual prompt that is not the most-upstream or root textual prompt can instead contain a variable text field that is configured or intended to be filled with the specific name or identifier of whatever entity or entities answer whatever textual prompt is immediately upstream of that given textual prompt.

In the non-limiting example of FIG. 3, the design discovery tree 204 can comprise, as its root, a textual prompt 302. In various aspects, the textual prompt 302 can correspond or otherwise pertain to a design detail 304, where the design detail 304 can be any suitable general or generic feature, aspect, property, characteristic, or category that relates in some way to the technical design of, the technical functioning of, the technical fabrication of, the technical maintenance of, or the technical troubleshooting of the medical imaging scanner 104. Accordingly, the textual prompt 302 can be any suitable interrogative or imperative sentence or sentence fragment that requests or commands identification of the design detail 304. As a non-limiting example, suppose that the design detail 304 is a subsystems category. In such case, the textual prompt 302 can be: the following interrogative sentence "What are all the subsystems of [insert scanner identifier here]?"; or the following imperative sentence "Identify all the subsystems of [insert scanner identifier here]".

In various aspects, the textual prompt 302 can have a known semantic relation 306 with a textual prompt 308, such that the textual prompt 308 can be considered as being directly downstream of the textual prompt 302. In various instances, the textual prompt 308 can correspond or otherwise pertain to a design detail 310, where the design detail 310 can be any suitable general or generic feature, aspect, property, characteristic, or category that relates in some way to the technical design of, the technical functioning of, the technical fabrication of, the technical maintenance of, or the technical troubleshooting of the medical imaging scanner 104. In various cases, the design detail 310 can be different from or otherwise not the same as the design detail 304. Moreover, in various aspects, the design detail 310 can depend upon or otherwise be related to the known semantic relation 306. In any case, the textual prompt 302 can be any suitable interrogative or imperative sentence or sentence fragment that requests or commands identification of the design detail 310.

As a non-limiting example, suppose, as mentioned above, that the design detail 304 is a subsystems category. Furthermore, suppose that the known semantic relation 306 is a "has-parts" relation, and suppose that the design detail 310 is a parts category. In such case, the textual prompt 308 can be: the following interrogative sentence "What are all the constituent parts of [insert subsystem identifier here]?"; or the following imperative sentence "Identify all the constituent parts of [insert subsystem identifier here]".

In various aspects, the textual prompt 308 can have a known semantic relation 312 with a textual prompt 314, such that the textual prompt 314 can be considered as being directly downstream of the textual prompt 308 and as being indirectly downstream of the textual prompt 302. In various instances, the textual prompt 314 can correspond or otherwise pertain to a design detail 316, where the design detail 316 can be any suitable general or generic feature, aspect, property, characteristic, or category that relates in some way to the technical design of, the technical functioning of, the technical fabrication of, the technical maintenance of, or the technical troubleshooting of the medical imaging scanner 104. In various cases, the design detail 316 can be different from or otherwise not the same as the design detail 304 and the design detail 310. Moreover, in various aspects, the design detail 316 can depend upon or otherwise be related to the known semantic relation 312. In any case, the textual prompt 314 can be any suitable interrogative or imperative sentence or sentence fragment that requests or commands identification of the design detail 316.

As a non-limiting example, suppose, as mentioned above, that the design detail 310 is a parts category. Furthermore, suppose that the known semantic relation 312 is a "has-errors" relation, and suppose that the design detail 316 is an error codes category. In such case, the textual prompt 314 can be: the following interrogative sentence "What are all the possible error codes that can be outputted by [insert constituent part identifier here]?"; or the following imperative sentence "Identify all the possible error codes that can be outputted by [insert constituent part identifier here]".

As another non-limiting example, suppose, as mentioned above, that the design detail 310 is a parts category. Furthermore, suppose that the known semantic relation 312 is a "has-sensors" relation, and suppose that the design detail 316 is a sensors category. In such case, the textual prompt 314 can be: the following interrogative sentence "What are all the sensors with which [insert constituent part identifier here] is equipped?"; or the following imperative sentence "Identify all the sensors with which [insert constituent part identifier here] is equipped".

As even another non-limiting example, suppose, as mentioned above, that the design detail 310 is a parts category. Furthermore, suppose that the known semantic relation 312 is a "has-diagnostic-test" relation, and suppose that the design detail 316 is a diagnostic tests category. In such case, the textual prompt 314 can be: the following interrogative sentence "What are all the possible diagnostic tests that can be performed on or by [insert constituent part identifier here]?"; or the following imperative sentence "Identify all the possible diagnostic tests that can be performed on or by [insert constituent part identifier here]".

In various aspects, the textual prompt 308 can have a known semantic relation 318 with a textual prompt 320, such that the textual prompt 320 can be considered as being directly downstream of the textual prompt 308 and as being indirectly downstream of the textual prompt 302. In various instances, the textual prompt 320 can correspond or otherwise pertain to a design detail 322, where the design detail 322 can be any suitable general or generic feature, aspect, property, characteristic, or category that relates in some way to the technical design of, the technical functioning of, the technical fabrication of, the technical maintenance of, or the technical troubleshooting of the medical imaging scanner 104. In various cases, the design detail 322 can be different from or otherwise not the same as the design detail 304, the design detail 310, and the design detail 316. Moreover, in various aspects, the design detail 322 can depend upon or otherwise be related to the known semantic relation 318. In any case, the textual prompt 320 can be any suitable interrogative or imperative sentence or sentence fragment that requests or commands identification of the design detail 322.

As a non-limiting example, suppose, as mentioned above, that the design detail 310 is a parts category. Furthermore, suppose that the known semantic relation 318 is a "has-failure-mode" relation, and suppose that the design detail 322 is a failure modes category. In such case, the textual prompt 320 can be: the following interrogative sentence "What are all the possible failure modes that can be experienced by [insert constituent part identifier here]?"; or the following imperative sentence "Identify all the possible failure modes that can be experienced by [insert constituent part identifier here]".

In various aspects, the textual prompt 320 can have a known semantic relation 324 with a textual prompt 326, such that the textual prompt 326 can be considered as being directly downstream of the textual prompt 320 and as being indirectly downstream of the textual prompt 308 and of the textual prompt 302. In various instances, the textual prompt 326 can correspond or otherwise pertain to a design detail 328, where the design detail 328 can be any suitable general or generic feature, aspect, property, characteristic, or category that relates in some way to the technical design of, the technical functioning of, the technical fabrication of, the technical maintenance of, or the technical troubleshooting of the medical imaging scanner 104. In various cases, the design detail 328 can be different from or otherwise not the same as the design detail 304, the design detail 310, the design detail 316, and the design detail 322. Moreover, in various aspects, the design detail 328 can depend upon or otherwise be related to the known semantic relation 324. In any case, the textual prompt 326 can be any suitable interrogative or imperative sentence or sentence fragment that requests or commands identification of the design detail 328.

As a non-limiting example, suppose, as mentioned above, that the design detail 322 is a failure modes category. Furthermore, suppose that the known semantic relation 324 is a "has-cause" relation, and suppose that the design detail 328 is a causes category. In such case, the textual prompt 320 can be: the following interrogative sentence "What are all the possible causes of [insert failure mode identifier here]?"; or the following imperative sentence "Identify all the possible causes of [insert failure mode identifier here]".

In various cases, as mentioned above, text prompts in the design discovery tree 204 can comprise or contain variable text fields (e.g., indicated by [insert identifier here] in the above examples). In various aspects, the graph component 114 can modify the design discovery tree 204, by inserting appropriate names or identifiers into those variable text fields. In some instances, this can involve making duplicates or copies of various textual prompts and inserting such names or identifiers into the variable text fields of those duplicates or copies. Indeed, as described herein, the graph component 114 can utilize the deep learning neural network 202 so as to synthesize respective textual content that answers or otherwise responds to each textual prompt in the design discovery tree 204. So, for any given textual prompt, the graph component 114 can synthesize textual content that answers or responds to that given textual prompt. If that synthesized textual content explicitly includes or calls-out multiple discrete entities, then respective copies of whatever textual prompts are downstream of that given textual prompt can be made for each of those multiple discrete entities, and the names or identifiers of those multiple discrete entities can be separately inserted into the appropriate variable text fields of those respective copies. Accordingly, in the non-limiting example shown in FIG. 3, the textual prompt 308 (and the known semantic relation 306) can be repeated or duplicated as necessary, based on whatever textual content is synthesized by the graph component 114 for the textual prompt 302. Likewise, the textual prompt 314 (and the known semantic relation 312) can be repeated or duplicated as necessary, based on whatever textual content is synthesized by the graph component 114 for the textual prompt 308 (e.g., based on whatever textual content is synthesized for each copy of the textual prompt 308). Similarly, the textual prompt 320 (and the known semantic relation 318) can be repeated or duplicated as necessary, based on whatever textual content is synthesized by the graph component 114 for the textual prompt 308 (e.g., based on whatever textual content is synthesized for each copy of the textual prompt 308). Also, the textual prompt 326 can be repeated or duplicated as necessary, based on whatever textual content is synthesized by the graph component 114 for the textual prompt 320 (e.g., based on whatever textual content is synthesized for each copy of the textual prompt 320). This is explained further with respect to FIG. 12.

In any case, the graph component 114 can, in a top-down order or sequence, electronically execute the deep learning neural network 202 in RAG fashion on each of the textual prompts of the design discovery tree 204, with the plurality of design documents 106 serving as RAG references or context. This can cause the graph component 114 to synthesize respective textual contents that substantively respond to each of the textual prompts of the design discovery tree 204. In various aspects, each of such synthesized textual contents can serve or otherwise be treated as a respective node of the knowledge graph 206, and such nodes can be coupled as appropriate with the known semantic relations of the design discovery tree 204. Non-limiting aspects are described with respect to FIGS. 4-12.

FIGS. 4-12 illustrate example, non-limiting block diagrams 400, 500, 600, 700, 800, 900, 1000, 1100, and 1200 showing how the knowledge graph 206 can be incrementally constructed via generative artificial intelligence in accordance with one or more embodiments described herein. In particular, the graph component 114 can iterate through the design discovery tree 204 in an upstream-to-downstream direction, starting with the most-upstream (or root) textual prompt. In the non-limiting example of FIG. 3, this can mean that the graph component 114 can begin at the textual prompt 302 and can subsequently proceed to the textual prompt 308 and thereafter to the remaining textual prompts in a breadth-first or depth-first fashion. FIGS. 4-7 show how the graph component 114 can consider the textual prompt 302. FIGS. 8-11 show how the graph component 114 can subsequently consider the textual prompt 308. FIG. 12 pertains to how textual prompts can be copied based on whatever textual content is synthesized upstream of them.

Figure 4:
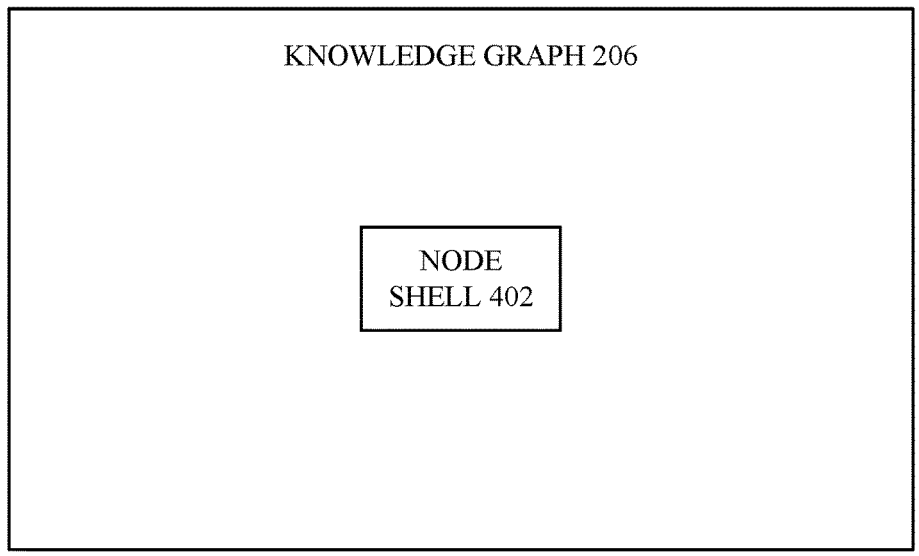

First, consider FIG. 4. In various aspects, the graph component 114 can electronically create the knowledge graph 206 so as to be initially empty. In other words, the knowledge graph 206 can initially have no nodes and no edges. As shown, when the graph component 114 considers the textual prompt 302, the graph component 114 can, in various instances, insert a node shell 402 into the knowledge graph 206. The node shell 402 can be considered as a node representing the textual prompt 302 that does not yet have any substantive content. In other words, the node shell 402 can initially be empty.

Figure 5:
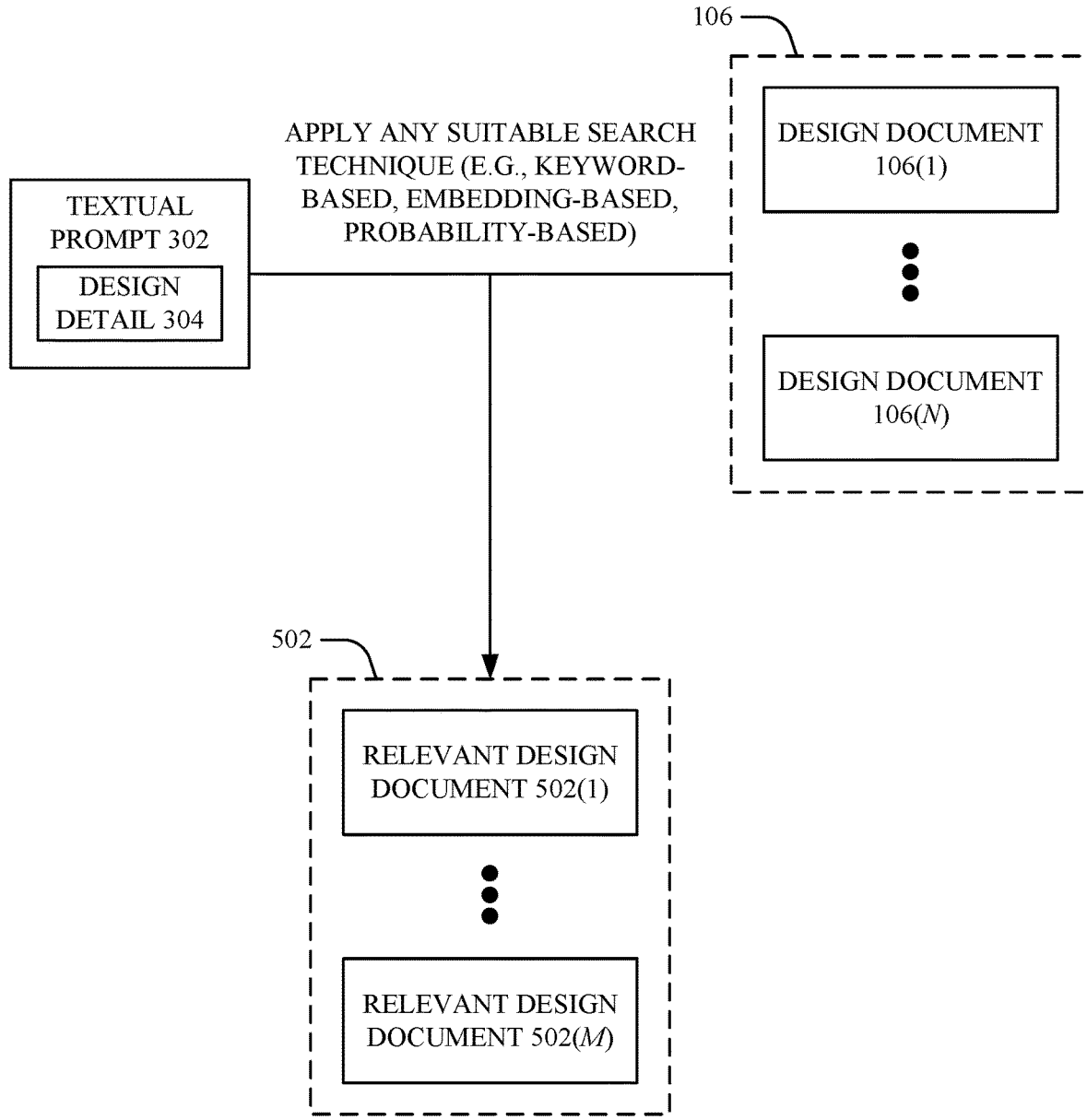

Now, consider FIG. 5. In various embodiments, the graph component 114 can electronically search through the plurality of design documents 106, so as to identify which of the plurality of design documents 106 are substantively relevant to the textual prompt 302. In various aspects, the graph component 114 can accomplish this via any suitable document searching technique.

As a non-limiting example, the graph component 114 can apply any suitable keyword-based document searching technique to the plurality of design documents 106. In such cases, the graph component 114 can identify (e.g., via named entity recognition) one or more keywords that are contained or recited in the textual prompt 302, and the graph component 114 can search the plurality of design documents 106 for whichever (if any) design documents also contain or recite those one or more keywords. If any given design document contains or recites those one or more keywords, then that given design document can be considered as being substantively relevant or otherwise related to the textual prompt 302. For instance, if the textual prompt 302 asks "What are all the fault modes of the gantry motor?", then any design document that recites the keywords "fault" and "gantry motor" can be considered as being substantively pertinent to the textual prompt 302.

As another non-limiting example, the graph component 114 can apply any suitable embedding-based document searching technique to the plurality of design documents 106. In such cases, the graph component 114 can generate (e.g., via a deep learning autoencoder trained in unsupervised fashion) a first embedding (e.g., a latent vector representation) of the textual prompt 302, the graph component 114 can likewise generate or otherwise access second embeddings of respective design documents in the plurality of design documents 106, and the graph component 114 can determine which (if any) of those second embeddings are sufficiently similar (e.g., in terms of Euclidean distance or cosine similarity) to the first embedding. If the second embedding of any given design document is within any suitable threshold level of similarity of the first embedding of the textual prompt 302, then that given design document can be considered as being (e.g., as containing textual, numerical, or graphical data that is) substantively relevant or otherwise related to the textual prompt 302.

As yet another non-limiting example, the graph component 114 can apply any suitable probability-based document searching technique to the plurality of design documents 106. For instance, the graph component 114 can utilize a Term Frequency-Inverse Document Frequency (TF-IDF) searching technique. As another instance, the graph component 114 can utilize a Best Match 25 searching technique.

Regardless of the type of document searching technique that is implemented, the graph component 114 can search through the plurality of design documents 106, so as to identify one or more design documents that are substantively relevant to the textual prompt 302. In various aspects, such substantively relevant documents can be considered or otherwise referred to as one or more relevant design documents 502. In various instances, as shown, the one or more relevant design documents 502 can comprise m documents, for any suitable positive integer m≤n: a relevant design document 502(1) to a relevant design document 502(m). In some cases, the graph component 114 can rank (e.g., in keyword-fashion, in embedding-fashion, or in probability-fashion) the plurality of design documents 106 in order of substantive relevance to the textual prompt 302, and whichever m of those documents are most highly ranked can be considered as the one or more relevant design documents 502.

Figure 6:
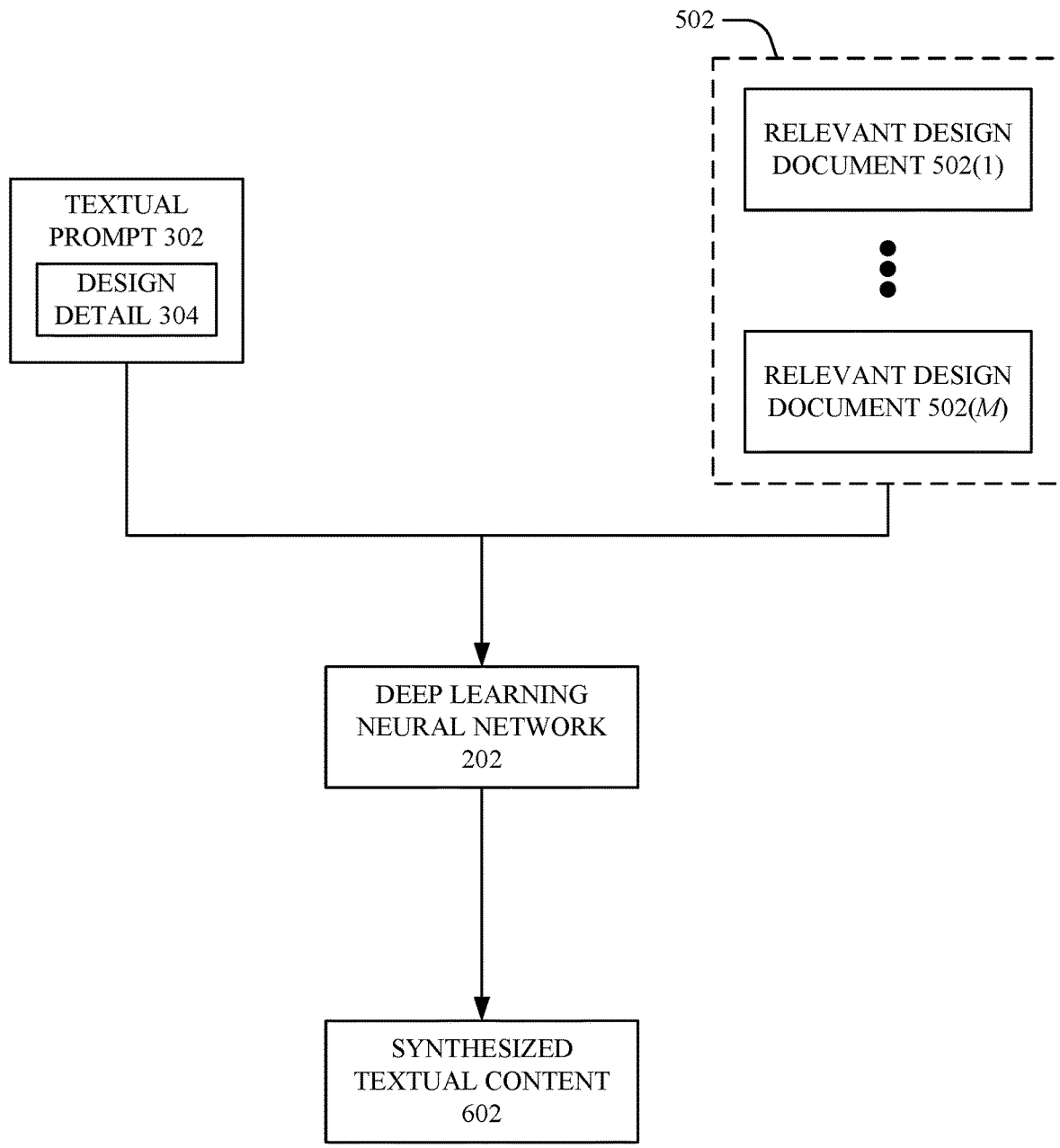

Now, consider FIG. 6. In various aspects, the graph component 114 can electronically execute the deep learning neural network 202 on the textual prompt 302 and on the one or more relevant design documents 502. In various instances, such execution can cause the deep learning neural network 202 to produce synthesized textual content 602. More specifically, the graph component 114 can concatenate the textual prompt 302 with the one or more relevant design documents 502, thereby yielding a concatenation. In various cases, the graph component 114 can feed or route that concatenation to an input layer of the deep learning neural network 202. In various aspects, that concatenation can complete a forward pass through one or more hidden layers of the deep learning neural network 202. In various instances, an output layer of the deep learning neural network 202 can calculate or compute the synthesized textual content 602, based on activation maps or feature maps generated by the one or more hidden layers.

In any case, the synthesized textual content 602 can be one or more declarative sentences or sentence fragments that the deep learning neural network 202 generated to be substantively or semantically responsive to whatever question or command is conveyed by the textual prompt 302. More specifically, as mentioned above, the textual prompt 302 can request or command identification of the design detail 304 of the medical imaging scanner 104, and the one or more relevant design documents 502 can be considered as describing or explaining (possibly in a voluminous, multi-paragraph, or multi-page fashion) information that is substantively relevant to the textual prompt 302 and thus to the design detail 304. In various aspects, the deep learning neural network 202 can be considered as succinctly distilling that information into a plain text or natural language sentence or sentence fragment that explicitly identifies the design detail 304 of the medical imaging scanner 104, and such sentence or sentence fragment can be considered as the synthesized textual content 602.

Figure 7:
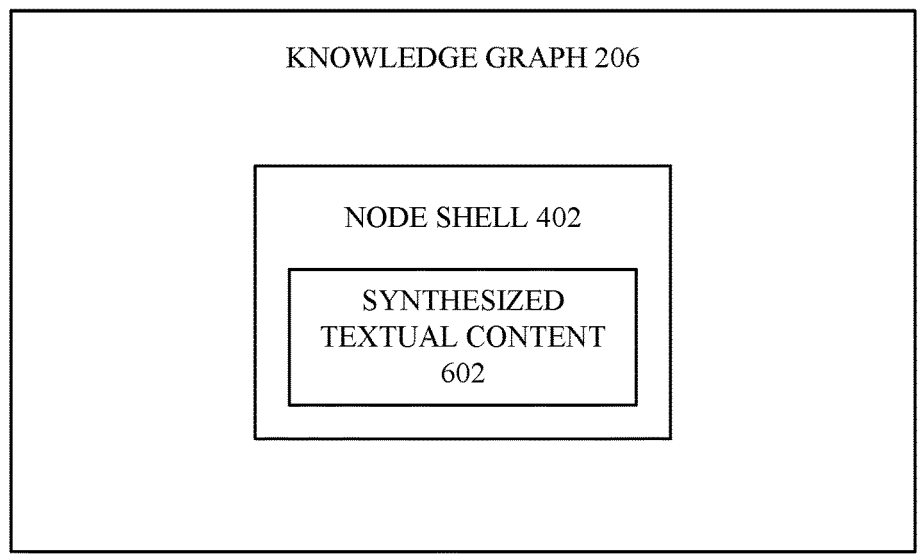

Now, consider FIG. 7. In various aspects, the graph component 114 can insert the synthesized textual content 602 into the node shell 402. In other words, the node shell 402 can have been initially empty but can now be filled with the synthesized textual content 602. In various instances, the graph component 114 can be finished with the textual prompt 302 and can thus proceed to the textual prompt 308.

Figure 8:
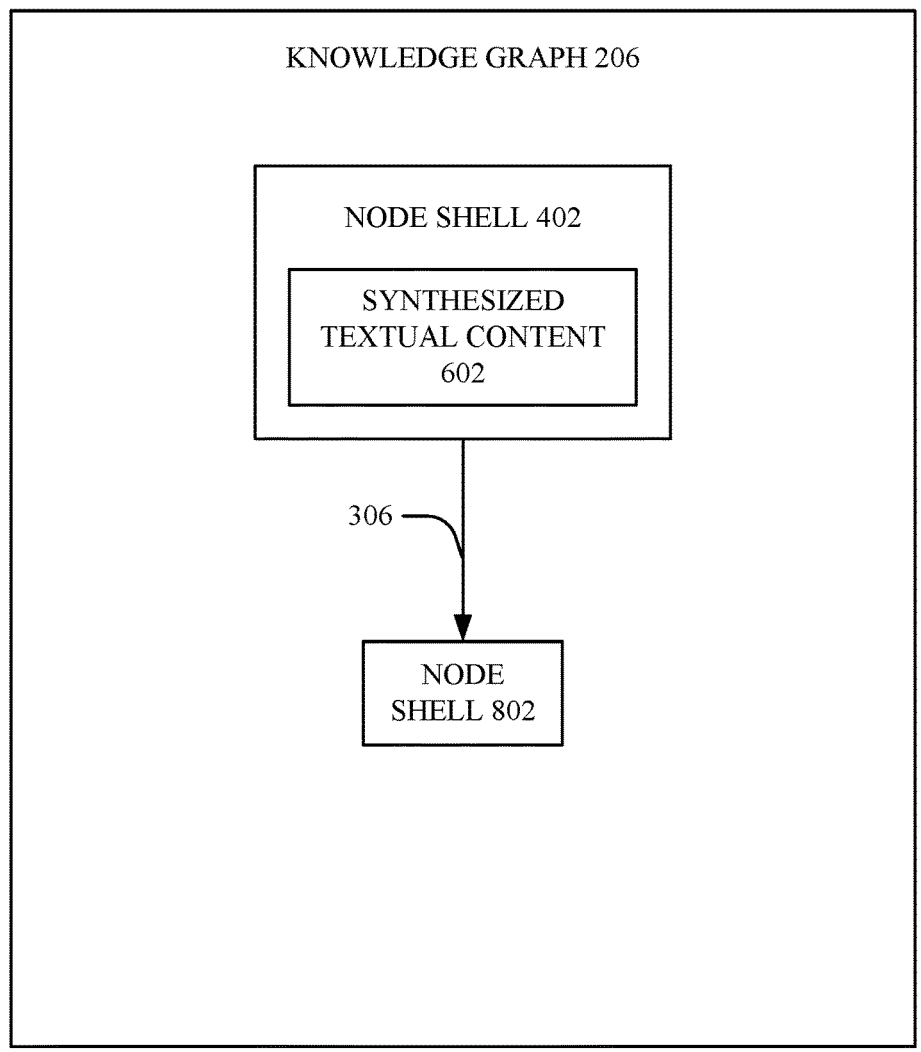

Consider FIG. 8. In various aspects, the graph component 114 can electronically insert a node shell 802 into the knowledge graph 206. In various instances, the node shell 802 can be considered as a node representing the textual prompt 308 that does not yet have any substantive content. In other words, the node shell 802 can initially be empty. Because the textual prompt 308 has the known semantic relation 306 with the textual prompt 302, and because the node shell 402 represents the textual prompt 302, the graph component 114 can further insert, between the node shell 402 and the node shell 802, an edge representing the known semantic relation 306.

Figure 9:
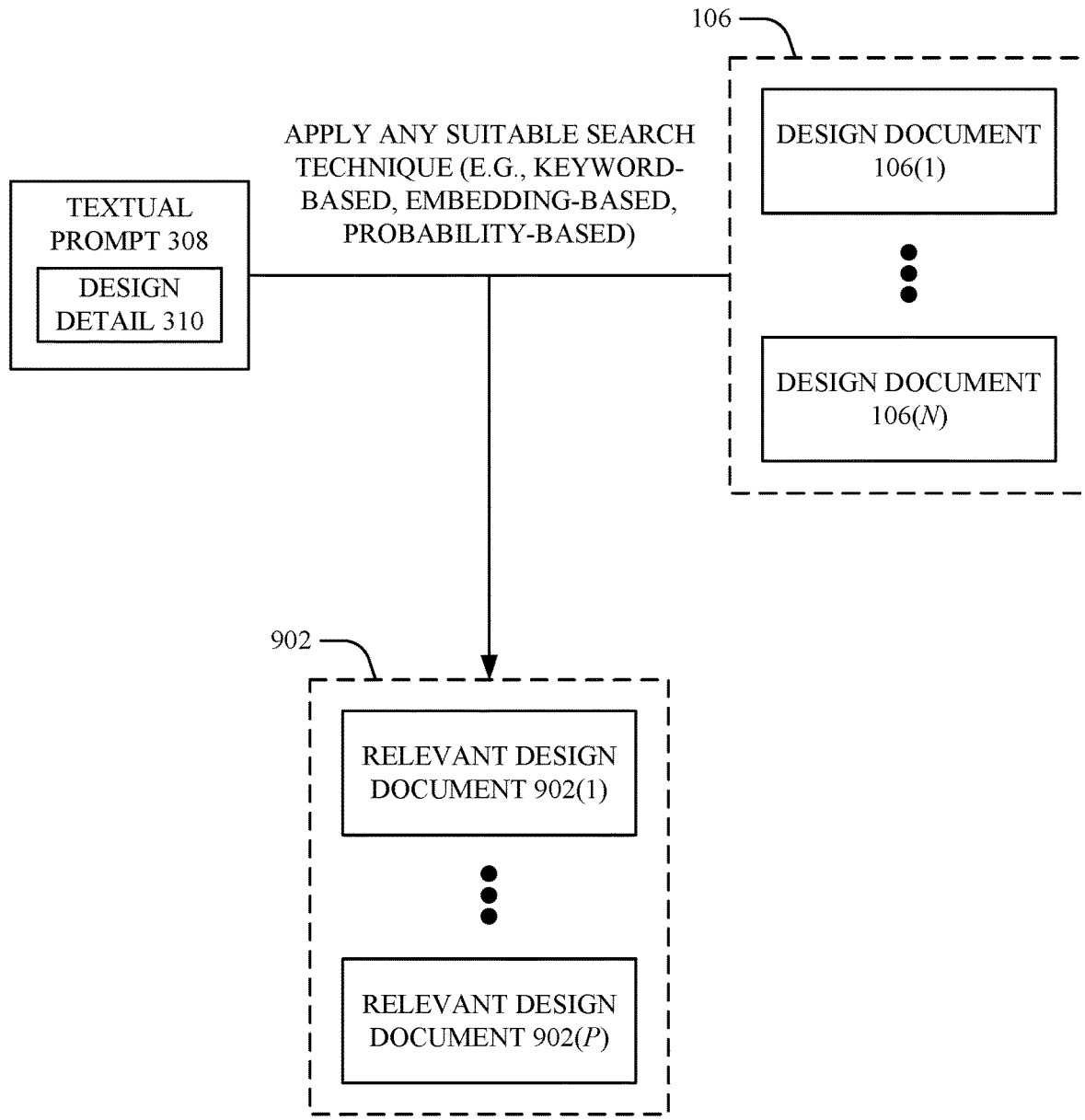

Now, consider FIG. 9. In various embodiments, the graph component 114 can electronically search through the plurality of design documents 106, so as to identify which of the plurality of design documents 106 are substantively relevant to the textual prompt 308. As above, the graph component 114 can accomplish this via any suitable document searching technique (e.g., keyword-based searching, embedding-based searching, probability-based searching). Regardless of the type of document searching technique that is implemented, the graph component 114 can search through the plurality of design documents 106, so as to identify one or more design documents that are substantively relevant to the textual prompt 308. In various aspects, such substantively relevant documents can be considered or otherwise referred to as one or more relevant design documents 902. In various instances, as shown, the one or more relevant design documents 902 can comprise p documents, for any suitable positive integer p≤n: a relevant design document 902(1) to a relevant design document 902(p). In some cases, the graph component 114 can rank (e.g., in keyword-fashion, in embedding-fashion, or in probability-fashion) the plurality of design documents 106 in order of substantive relevance to the textual prompt 308, and whichever p of those documents are most highly ranked can be considered as the one or more relevant design documents 902. In some cases, p can be equal to m. In other cases, however, p can be unequal to m.

Figure 10:
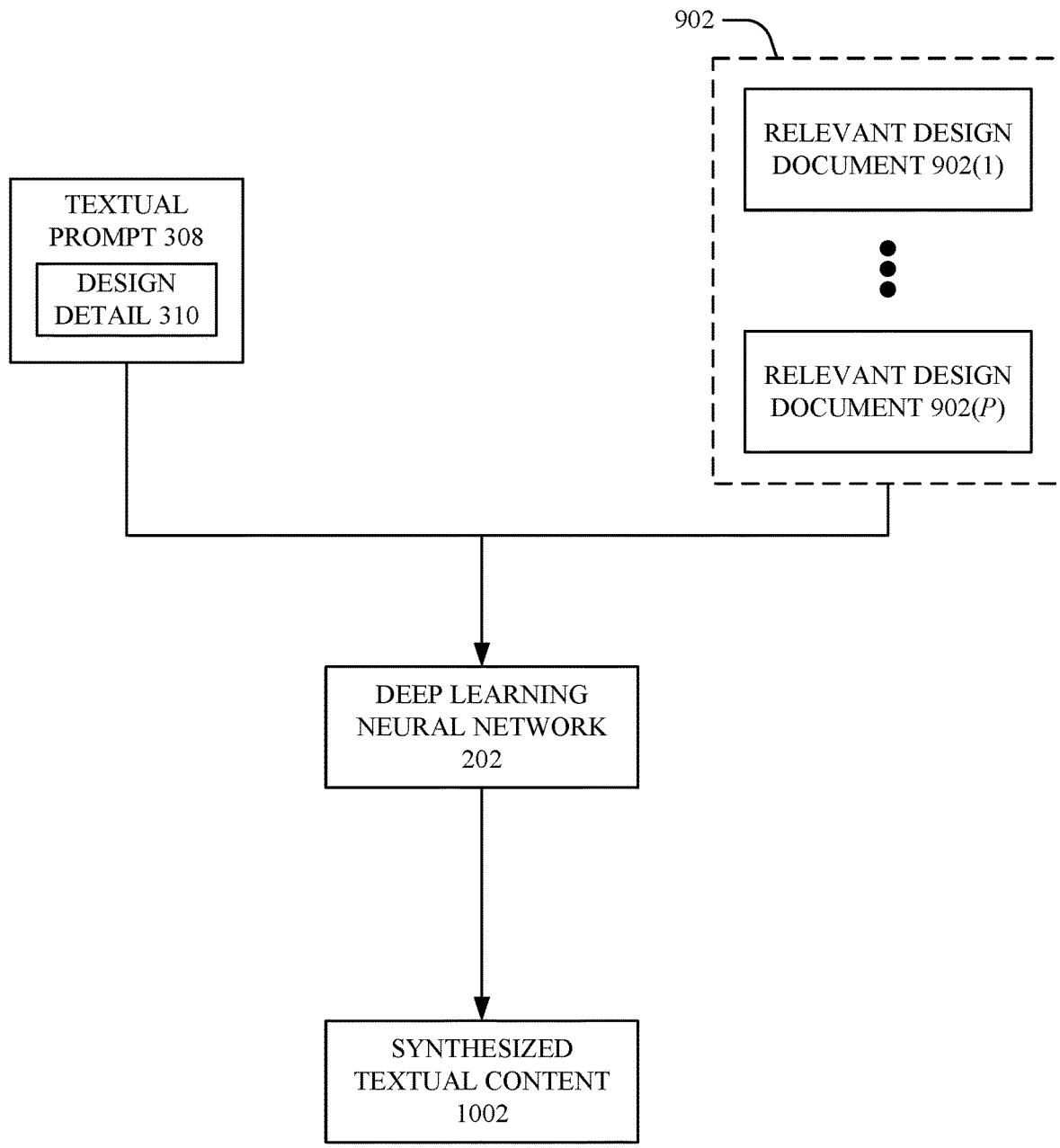

Now, consider FIG. 10. In various aspects, the graph component 114 can electronically execute the deep learning neural network 202 on the textual prompt 308 and on the one or more relevant design documents 902. In various instances, such execution can cause the deep learning neural network 202 to produce synthesized textual content 1002. More specifically, the graph component 114 can concatenate the textual prompt 308 with the one or more relevant design documents 902, thereby yielding a concatenation. In various cases, the graph component 114 can feed or route that concatenation to the input layer of the deep learning neural network 202. In various aspects, that concatenation can complete a forward pass through the one or more hidden layers of the deep learning neural network 202. In various instances, the output layer of the deep learning neural network 202 can calculate or compute the synthesized textual content 1002, based on activation maps or feature maps generated by the one or more hidden layers.

In any case, the synthesized textual content 1002 can be one or more declarative sentences or sentence fragments that the deep learning neural network 202 generated to be substantively or semantically responsive to whatever question or command is conveyed by the textual prompt 308. More specifically, and just as above, the textual prompt 308 can request or command identification of the design detail 310 of the medical imaging scanner 104; the one or more relevant design documents 902 can be considered as describing or explaining (possibly in a voluminous, multi-paragraph, or multi-page fashion) information that is substantively relevant to the textual prompt 308 and thus to the design detail 310; the deep learning neural network 202 can be considered as succinctly distilling that information into a plain text or natural language sentence or sentence fragment that explicitly identifies the design detail 310 of the medical imaging scanner 104; and such sentence or sentence fragment can be considered as the synthesized textual content 1002.

Figure 11:
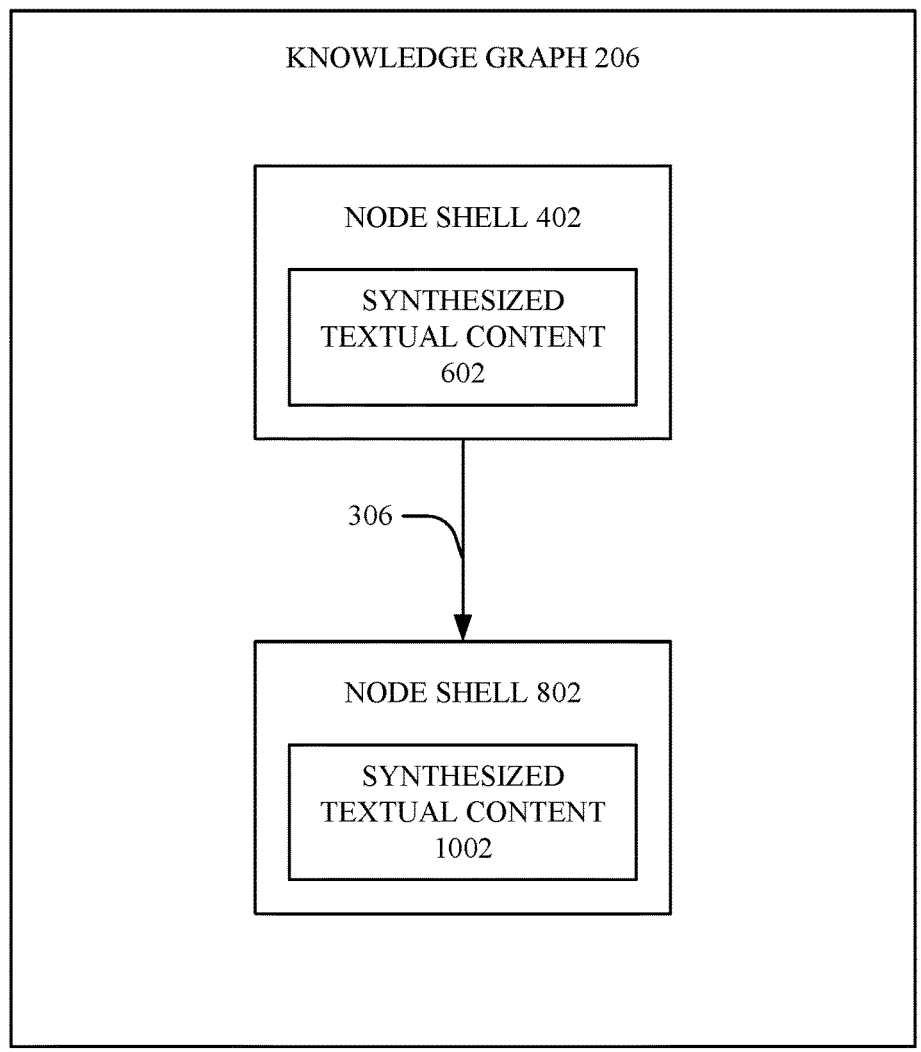

Now, consider FIG. 11. In various aspects, the graph component 114 can insert the synthesized textual content 1002 into the node shell 802. In other words, the node shell 802 can have been initially empty but can now be filled with the synthesized textual content 1002. In various instances, the graph component 114 can be finished with the textual prompt 308 and can thus proceed a next or subsequent textual prompt.

Now, consider FIG. 12. In various aspects, as mentioned above, various textual prompts in the design discovery tree 204 can contain variable text fields, and the graph component 114 can modify or alter the design discovery tree 204 by making appropriate copies of such various textual prompts and filling the variable text fields of those copies with appropriate entity names or identifiers. FIG. 12 illustrates a non-limiting example of how this can occur with respect to the textual prompt 308.

Indeed, suppose that the synthesized textual content 602 explicitly contains, identifies, or calls-out t distinct entities in response to the textual prompt 302, for any suitable positive integer t>1 (note that each of these t distinct entities can be considered as belonging to whatever technical category is indicated by the design detail 304). In various aspects, the graph component 114 can determine that the synthesized textual content 602 identifies or calls-out those t distinct entities, by applying any suitable NER technique to the synthesized textual content 602. In some cases, the graph component 114 can perform rule-based NER on the synthesized textual content 602, such as is provided by OpenNLP software platforms. In other cases, the graph component 114 can perform statistical-based NER on the synthesized textual content 602, such as is provided by SpaCy software platforms. In even other cases, the graph component 114 can perform transformer-based NER on the synthesized textual content 602.

In any case, because the synthesized textual content 602 can answer the textual prompt 302 with explicit identification of t distinct entities, the graph component 114 can make, in the design discovery tree 204, a total of t copies of all textual prompts that directly or indirectly branch off from the textual prompt 302, and the graph component 114 can separately insert the names or identifiers of those t distinct entities into the appropriate variable text fields of those t copies.

In particular, the textual prompt 308 can contain a variable text field into which each of the t distinct entities can be separately inserted. So, the graph component 114 can cause there to be a total of t distinct versions of the textual prompt 308 in the design discovery tree 204: a first version of the textual prompt 308 whose variable text field is filled with the name or identifier of the first distinct entity, to a t-th version of the textual prompt 308 whose variable text field is filled with the name or identifier of the t-th distinct entity. In various aspects, the graph component 114 can treat each of those t versions of the textual prompt 308 as described above, such that relevancy searching and node content synthesis based on the design detail 310 can be separately performed for each of those t distinct entities.

For instance, with respect to the first version of the textual prompt 308, the graph component 114 can: insert, into the knowledge graph 206, an initially-empty node shell 802(1) to represent that first version of the textual prompt 308; insert an edge representing the known semantic relation 306 between the node shell 402 and the node shell 802(1); identify one or more relevant design documents for that first version of the textual prompt 308; synthesize, via the deep learning neural network 202, synthesized textual content 1002(1) for that first version of the textual prompt 308 based on those one or more relevant design documents; and can insert the synthesized textual content 1002(1) into the node shell 802(1).

Likewise, with respect to the t-th version of the textual prompt 308, the graph component 114 can: insert, into the knowledge graph 206, an initially-empty node shell 802(1) to represent that t-th version of the textual prompt 308; insert an edge representing the known semantic relation 306 between the node shell 402 and the node shell 802(1); identify one or more relevant design documents for that t-th version of the textual prompt 308; synthesize, via the deep learning neural network 202, synthesized textual content 1002(1) for that t-th version of the textual prompt 308 based on those one or more relevant design documents; and can insert the synthesized textual content 1002(1) into the node shell 802(1).

In this way, the graph component 114 can modify or expand the design discovery tree 204, and thus the knowledge graph 206, based on how many district entities are identified, recited, or called-out in whatever textual context is synthesized for any given textual prompt.

To help clarify various aspects, consider the following non-limiting example. Suppose that the medical imaging scanner 104 is an MRI scanner having "MRI12345" as an identifier (e.g., this can be a model number or serial number of the medical imaging scanner 104). Furthermore, suppose that the textual prompt 302 asks "What are all the subsystems of [insert scanner identifier here]?". In various cases, the graph component 114 can insert the identifier "MRI12345" into the variable text field of the textual prompt 302, thereby causing the textual prompt 302 to become "What are all the subsystems of MRI12345?".

Now, suppose that the one or more relevant design documents 502 are paragraphs, pages, or schematics from a service manual of the medical imaging scanner 104 that describe, explain, or show: a gantry of the MRI12345 scanner, having "G123" as a model number or serial number; an X-ray tube of the MRI12345 scanner, having "X123" as a model number or serial number; and a patient-table of the MRI12345 scanner, having "T123" as a model number or serial number. In such case, the synthesized textual content 602 can be a declarative sentence stating "The MRI12345 scanner has a gantry G123 subsystem, an X-ray tube X123 subsystem, and a patient-table T123 subsystem.".

In various aspects, the graph component 114 can determine, via NER, that the synthesized textual content 602 in such case answers the textual prompt 302 by explicitly reciting, specifying, or calling-out three distinct entities (e.g., t=3): "gantry G123 subsystem"; "X-ray tube X123 subsystem"; and "patient-table T123 subsystem".

Now, suppose that the textual prompt 308 asks "What are all the parts of [insert subsystem identifier here]?". In various instances, the graph component 114 can create a respective version of the textual prompt 308 for each of the three distinct entities recited in the synthesized textual content 602. In particular, a first version of the textual prompt 308 can ask "What are all the parts of the gantry G123 subsystem?"; a second version of the textual prompt 308 can ask "What are all the parts of the X-ray tube X123 subsystem?"; and a third version of the textual prompt 308 can ask "What are all the parts of the patient-table T123 subsystem?".

Note that the first version of the textual prompt 308 can be accompanied by a corresponding version or copy of all other textual prompts that directly or indirectly branch off from the textual prompt 308 (e.g., a first version of the textual prompt 314 can directly branch off from the first version of the textual prompt 308; a first version of the textual prompt 320 can directly branch off from the first version of the textual prompt 308; and a first version of the textual prompt 326 can directly branch off from the first version of the textual prompt 320).

Similarly, note that the second version of the textual prompt 308 can be accompanied by a corresponding version or copy of all other textual prompts that directly or indirectly branch off from the textual prompt 308 (e.g., a second version of the textual prompt 314 can directly branch off from the second version of the textual prompt 308; a second version of the textual prompt 320 can directly branch off from the second version of the textual prompt 308; and a second version of the textual prompt 326 can directly branch off from the second version of the textual prompt 320).

Likewise, note that the third version of the textual prompt 308 can be accompanied by a corresponding version or copy of all other textual prompts that directly or indirectly branch off from the textual prompt 308 (e.g., a third version of the textual prompt 314 can directly branch off from the third version of the textual prompt 308; a third version of the textual prompt 320 can directly branch off from the third version of the textual prompt 308; and a third version of the textual prompt 326 can directly branch off from the third version of the textual prompt 320).

In any case, the graph component 114 can synthesize textual content for each of the three versions of the textual prompt 308, as described above, and can insert that synthesized textual content into respective node shells in the knowledge graph 206.

In this way, the graph component 114 can incrementally build, construct, or enlarge the knowledge graph 206 one or more nodes at a time, by iteratively executing the deep learning neural network 202 in RAG fashion on the design discovery tree 204. After all textual prompts in the design discovery tree 204 have been used to synthesize node content for the knowledge graph 206, the knowledge graph 206 can be considered as being complete or finished (e.g., at least until new textual prompts are added to the design discovery tree 204 or new documents are added to the plurality of design documents 106).

Figure 13:
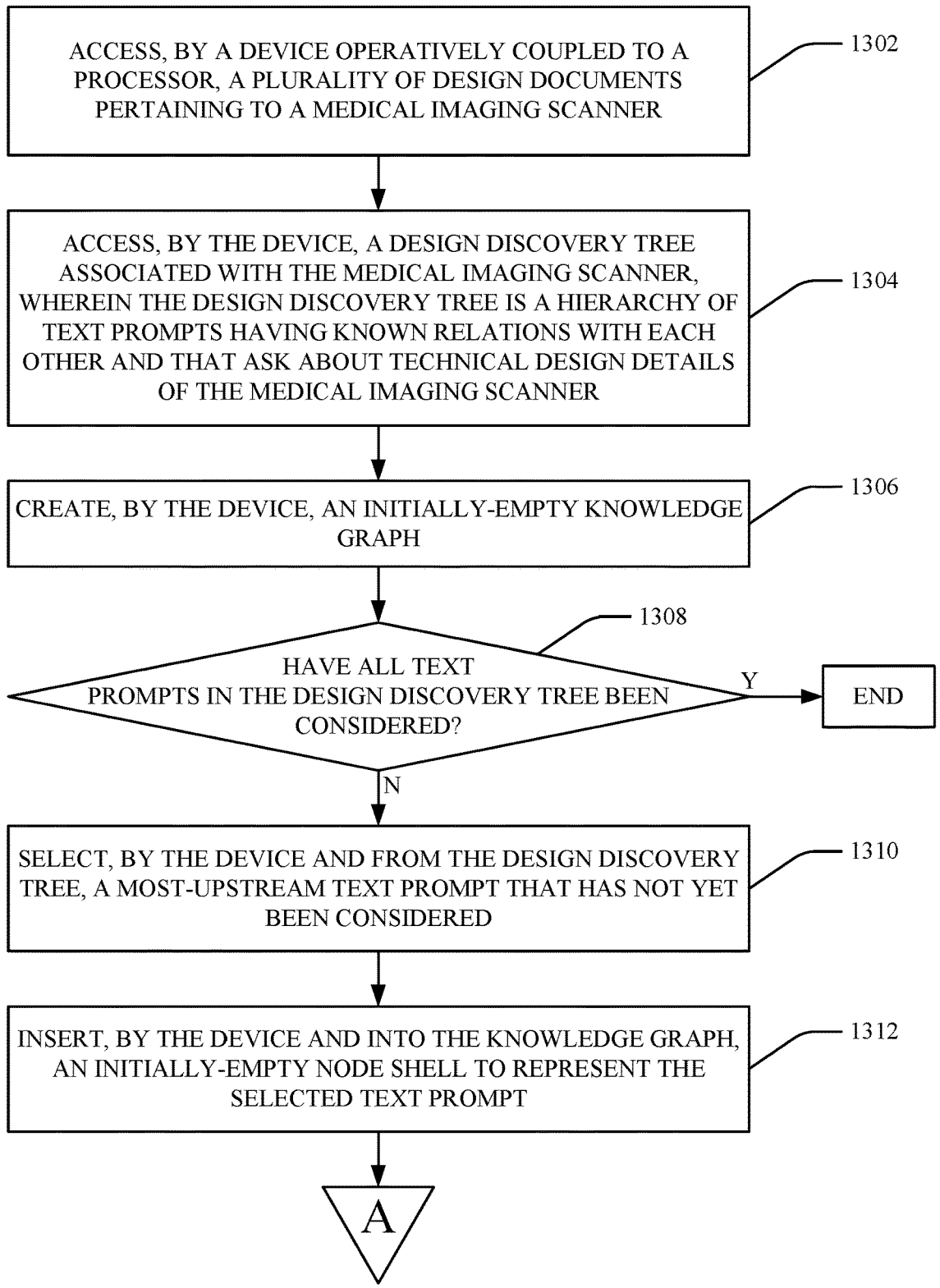
FIGS. 13-15 illustrate flow diagrams of example, non-limiting computer-implemented methods that facilitate knowledge graph construction via generative artificial intelligence in accordance with one or more embodiments described herein.
Figure 14:
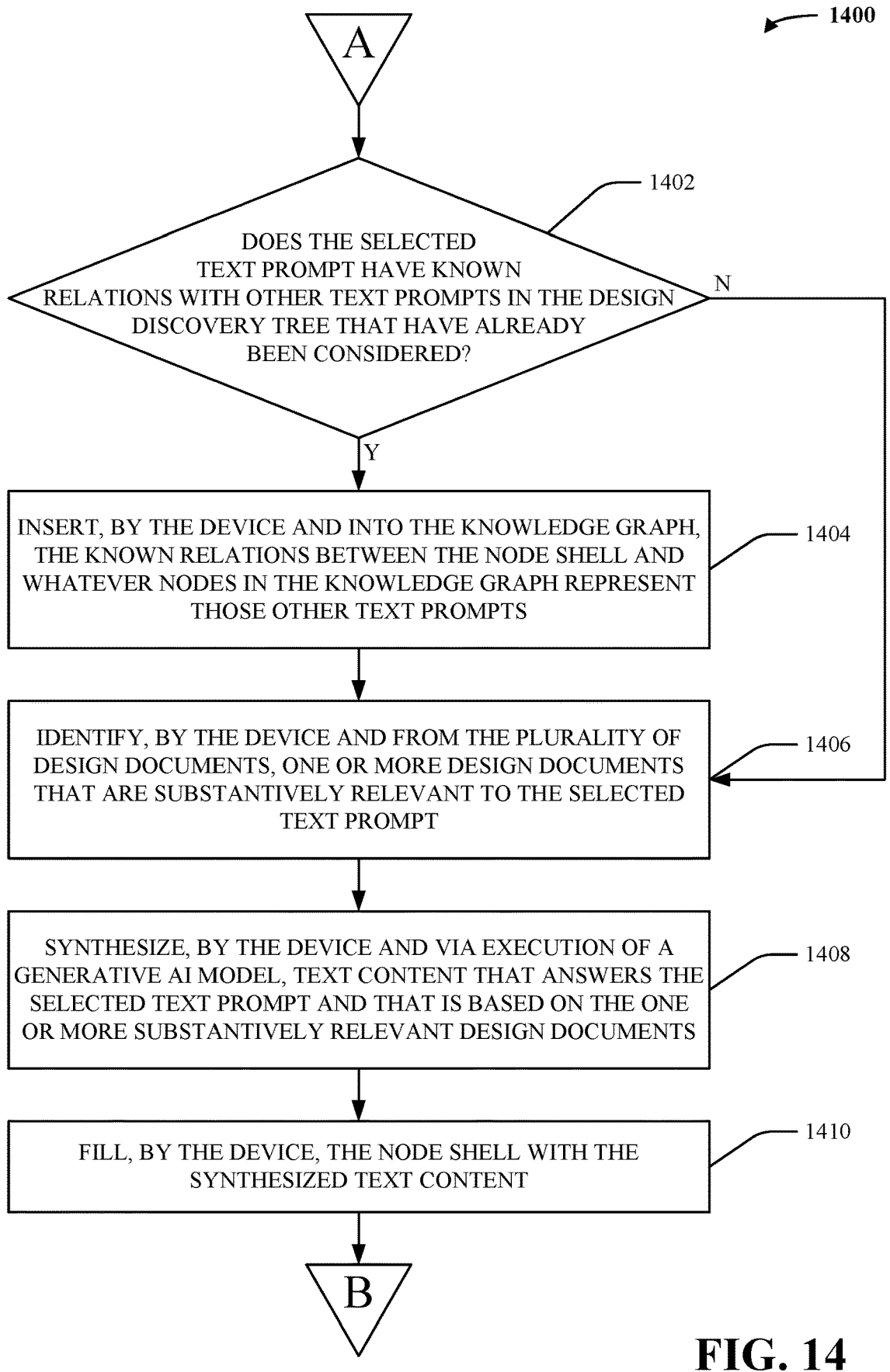
Figure 15:
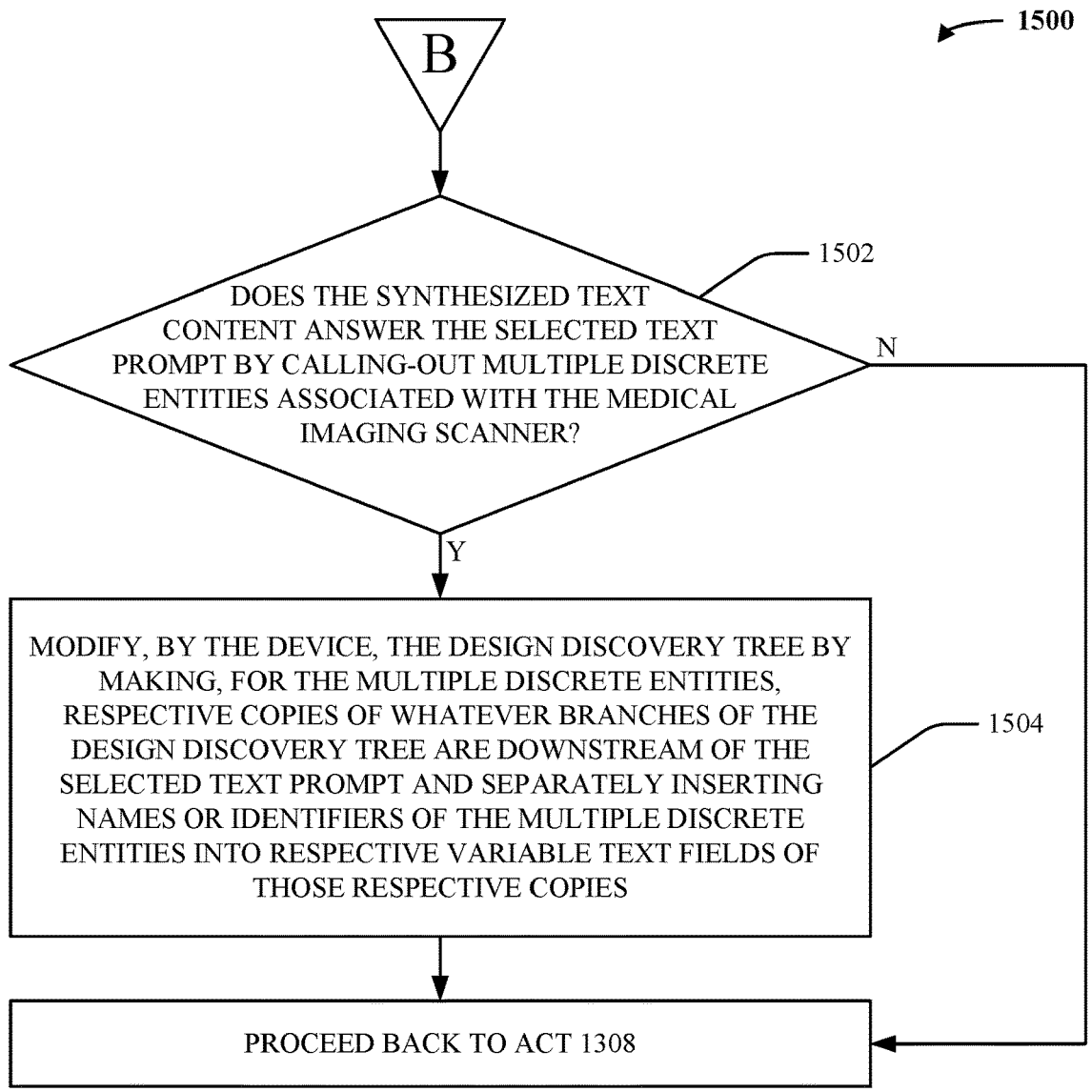

FIGS. 13-15 illustrate flow diagrams of example, non-limiting computer-implemented methods 1300, 1400, and 1500 that can facilitate knowledge graph construction via generative artificial intelligence in accordance with one or more embodiments described herein. In various cases, the knowledge graph construction system 102 can facilitate the computer-implemented methods 1300, 1400, and 1500.

First, consider FIG. 13. In various embodiments, act 1302 can include accessing, by a device (e.g., 112) operatively coupled to a processor (e.g., 108), a plurality of design documents (e.g., 106) pertaining to a medical imaging scanner (e.g., 104).

In various aspects, act 1304 can include accessing, by the device (e.g., via 114), a design discovery tree (e.g., 204) associated with the medical imaging scanner. In various cases, the design discovery tree can be a hierarchy of text prompts having known relations with each other and that ask about general or generic technical details of the medical imaging scanner (e.g., "What are the subsystems of [insert scanner identifier here]?"; "What are the sensors of [insert subsystem identifier here]?"; "What are the possible fault modes of [insert subsystem identifier here]?").

In various instances, act 1306 can include creating, by the device (e.g., via 114), an initially-empty knowledge graph (e.g., 206).

In various cases, act 1308 can include determining, by the device (e.g., via 114), whether all text prompts in the design discovery tree have been considered yet? If so, the computer-implemented method 1300 can end, meaning that the knowledge graph can be considered as being finished or complete. If not, the computer-implemented method 1300 can instead proceed to act 1310.

In various aspects, act 1310 can include selecting, by the device (e.g., via 114) and from the design discovery tree, a most-upstream text prompt (e.g., 302) that has not yet been considered.

In various instances, act 1312 can include inserting, by the device (e.g., 114) and into the knowledge graph, an initially-empty node shell (e.g., 402) to represent the selected text prompt. In various cases, the computer-implemented method 1300 can proceed to act 1402 of the computer-implemented method 1400.

Now, consider FIG. 14. In various embodiments, act 1402 can include determining, by the device (e.g., via 114), whether the selected text prompt has known relations (e.g., 306) with other text prompts in the design discovery tree that have already been considered. If so, the computer-implemented method 1400 can proceed to act 1404. If not, the computer-implemented method 1400 can instead proceed to act 1406.

In various aspects, act 1404 can include inserting, by the device (e.g., via 114) and into the knowledge graph, the known relations between the node shell and whatever nodes in the knowledge graph represent those other text prompts. In various cases, the computer-implemented method 1400 can then proceed to act 1406.

In various instances, act 1406 can include identifying, by the device (e.g., via 114) and from the plurality of design documents, one or more design documents (e.g., 502) that are substantively relevant to the selected text prompt.

In various cases, act 1408 can include synthesizing, by the device (e.g., via 114) and via execution of a generative artificial intelligence (AI) model (e.g., 202), text content (e.g., 602) that answers the selected text prompt and that is based on the one or more substantively relevant design documents. In various aspects, the computer-implemented method 1400 can proceed to act 1502 of the computer-implemented method 1500.

Now, consider FIG. 15. In various embodiments, act 1502 can include determining, by the device (e.g., via 114), whether the synthesized text content answers the selected text prompt by calling-out or reciting multiple discrete entities (e.g., t entities identified via NER) associated with the medical imaging scanner. If not, the computer-implemented method 1500 can proceed back to act 1308 of the computer-implemented method 1300. If so, the computer-implemented method 1500 can instead proceed to act 1504.

In various aspects, act 1504 can include modifying, by the device (e.g., via 114), the design discovery tree by making, for the multiple discrete entities, respective copies of whatever branches of the design discovery tree are downstream of the selected text prompt and separately inserting names or identifiers of the multiple discrete entities into respective variable text fields of those respective copies. In various cases, the computer-implemented method 1500 can then proceed back to act 1308 of the computer-implemented method 1300.

In any case, the graph component 114 can construct the knowledge graph 206 by leveraging the deep learning neural network 202 and the design discovery tree 204. After such construction, the knowledge graph construction system 102 can utilize the knowledge graph 206 so as to answer any technical questions that a user or operator of the medical imaging scanner 104 might have, as described with respect to FIGS. 16-17.

Figure 16:
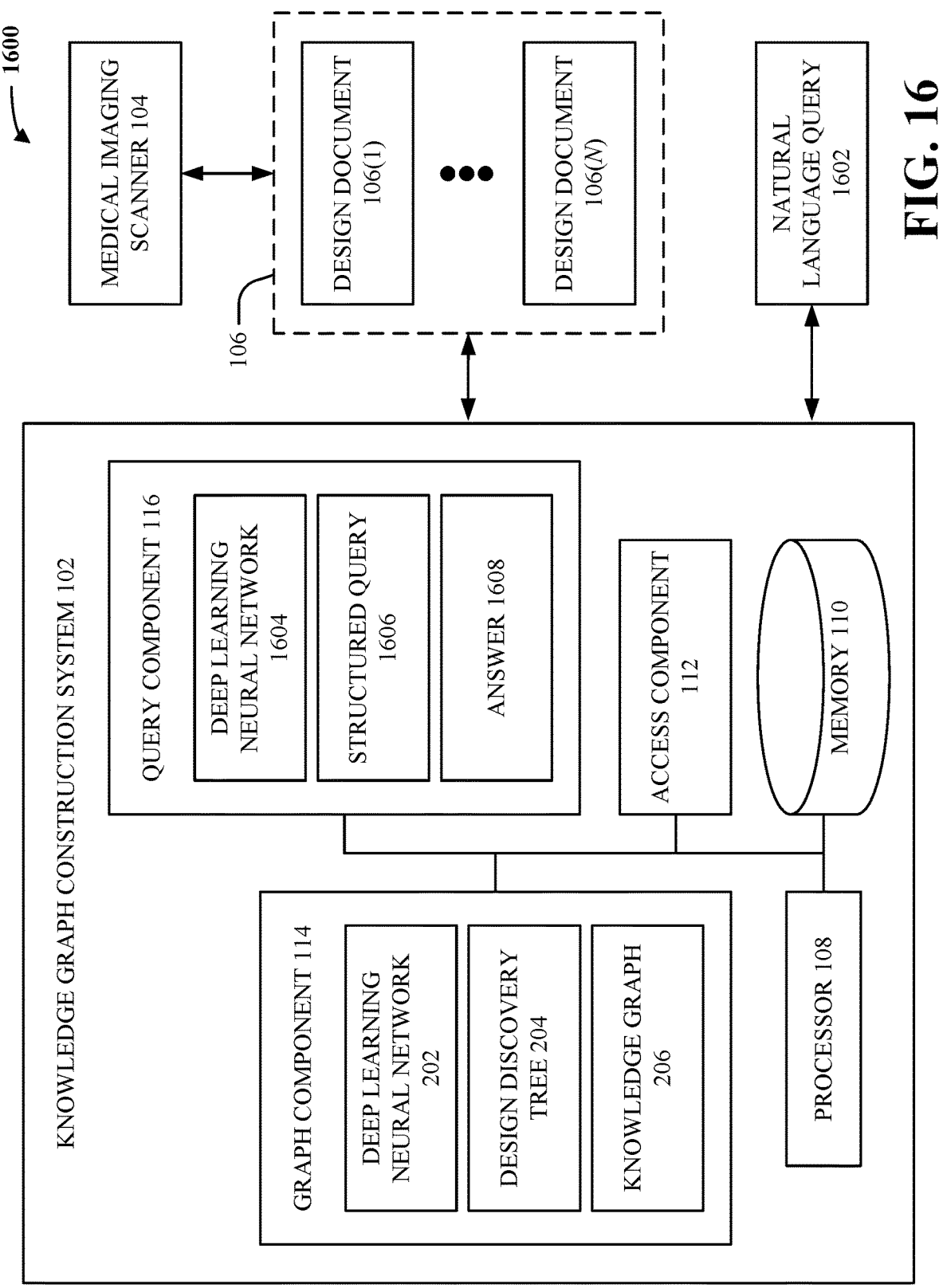
FIG. 16 illustrates a block diagram of an example, non-limiting system including a natural language query, another deep learning neural network, a structured query, and an answer that facilitates knowledge graph construction via generative artificial intelligence in accordance with one or more embodiments described herein.

FIG. 16 illustrates a block diagram of an example, non-limiting system 1600 including a natural language query, another deep learning neural network, a structured query, and an answer that can facilitate knowledge graph construction via generative artificial intelligence in accordance with one or more embodiments described herein. As shown, the system 1600 can, in some cases, comprise the same components as the system 200, and can further comprise a natural language query 1602, a deep learning neural network 1604, a structured query 1606, and an answer 1608.

In various embodiments, the access component 112 can electronically receive, electronically retrieve, or otherwise electronically access, from any suitable data structure or source, the natural language query 1602. In various aspects, the natural language query 1602 can be any suitable plain text question that asks about some technical aspect or feature of the medical imaging scanner 104. As a non-limiting example, the natural language query 1602 can ask why the medical imaging scanner 104 is producing image artefacts. As another non-limiting example, the natural language query 1602 can ask what maintenance should be performed on the medical imaging scanner 104 or how often such maintenance should be performed. In various instances, the natural language query 1602 can be provided or inputted by a user or operator of the medical imaging scanner 104 via any suitable human-computer interface device (e.g., via a keyboard, keypad, touchscreen, or voice control system of the medical imaging scanner 104).

In various aspects, the query component 116 can electronically store, electronically maintain, electronically control, or otherwise electronically access the deep learning neural network 1604. In various instances, the deep learning neural network 1604 can have or otherwise exhibit any suitable deep learning internal architecture. For instance, the deep learning neural network 1604 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of the specific internal architecture (e.g., the specific number, types, or organization of layers) implemented within the deep learning neural network 1604, the deep learning neural network 1604 can be configured as an unstructured-to-structured query converter or translator. That is, the deep learning neural network 1604 can be configured to receive unstructured queries as input and to produce corresponding structured queries as output. Accordingly, by leveraging the deep learning neural network 1604, the query component 116 can convert the natural language query 1602 into the structured query 1606. In various cases, the query component 116 can then generate the answer 1608 by executing the structured query 1606 over the knowledge graph 206. Non-limiting aspects are described with respect to FIG. 17.

Figure 17:
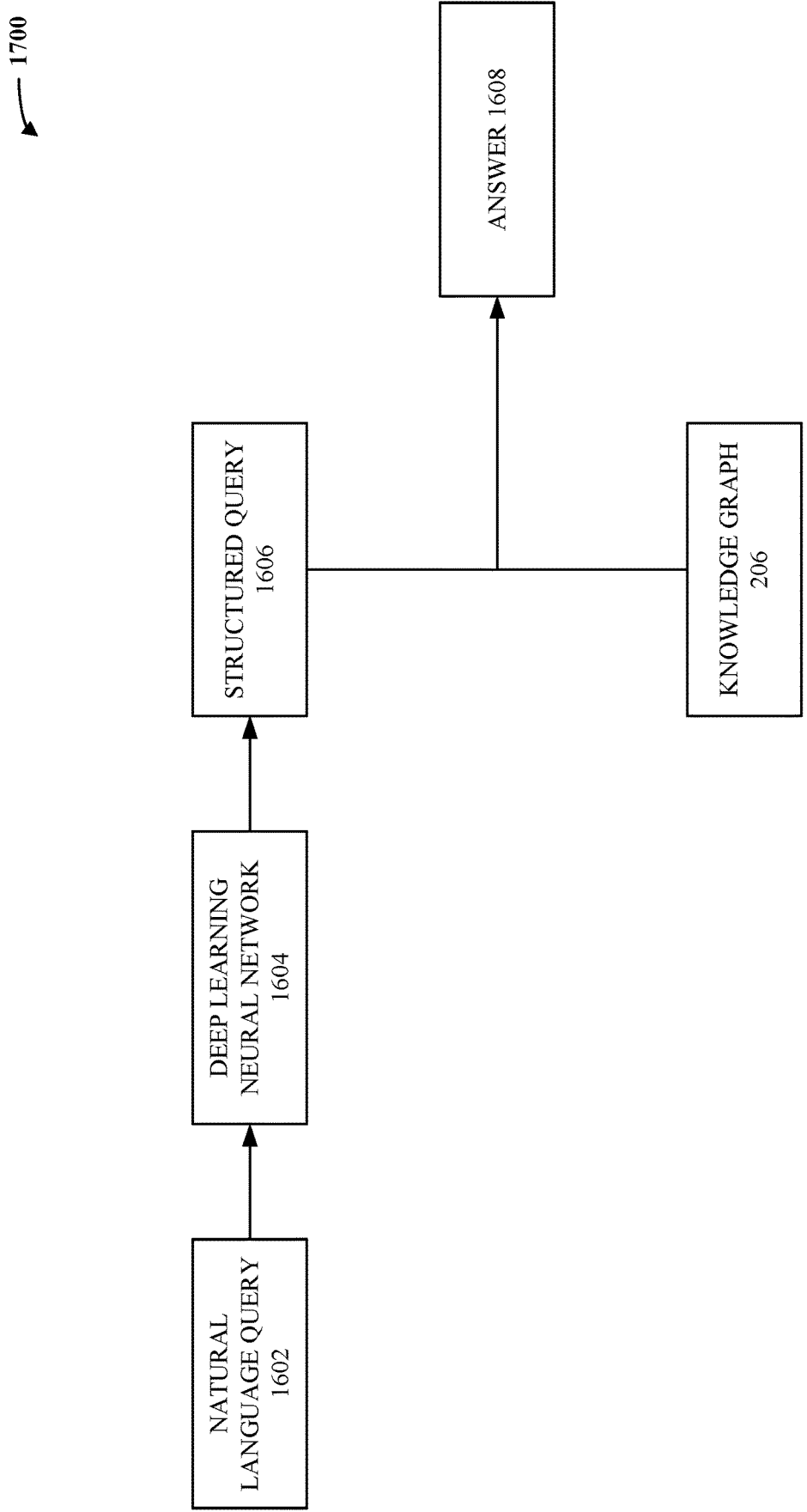
FIG. 17 illustrates an example, non-limiting block diagram showing how a natural language query can be converted into a structured query and then executed over a knowledge graph in accordance with one or more embodiments described herein.

FIG. 17 illustrates an example, non-limiting block diagram 1700 showing how the natural language query can be converted into the structured query 1606 and then executed over the knowledge graph 206 in accordance with one or more embodiments described herein.

In various embodiments, as mentioned above, the natural language query 1602 can be a plain text interrogative sentence that asks about some technical feature of the medical imaging scanner 104 and that is provided by a user or operator of the medical imaging scanner 104. In various aspects, the query component 116 can electronically execute the deep learning neural network 1604 on the natural language query 1602. In various instances, such execution can cause the deep learning neural network 1604 to produce the structured query 1606. More specifically, the query component 116 can feed or route the natural language query 1602 to an input layer of the deep learning neural network 1604. In various aspects, the natural language query 1602 can complete a forward pass through one or more hidden layers of the deep learning neural network 1604. In various instances, an output layer of the deep learning neural network 1604 can calculate or compute the structured query 1606, based on activation maps or feature maps generated by the one or more hidden layers.

In any case, the structured query 1606 can be considered as a rigorous formatted version of the natural language query 1602 that is amenable to graph execution. As a non-limiting example, the deep learning neural network 1604 can be configured to convert plain text into a SQL format. In such case, the structured query 1606 can be considered as being a semantically-equivalent version of the natural language query 1602 that is written or otherwise formatted according to a SQL syntax. As another non-limiting example, the deep learning neural network 1604 can be configured to convert plain text into a SPARQL format. In such case, the structured query 1606 can be considered as being a semantically-equivalent version of the natural language query 1602 that is written or otherwise formatted according to a SPARQL syntax. As even another non-limiting example, the deep learning neural network 1604 can be configured to convert plain text into a GraphQL format. In such case, the structured query 1606 can be considered as being a semantically-equivalent version of the natural language query 1602 that is written or otherwise formatted according to a GraphQL syntax. As yet another non-limiting example, the deep learning neural network 1604 can be configured to convert plain text into a Cypher format. In such case, the structured query 1606 can be considered as being a semantically-equivalent version of the natural language query 1602 that is written or otherwise formatted according to a Cypher syntax.

In various aspects, the query component 116 can electronically execute the structured query 1606 over the knowledge graph 206. In various instances, such execution can be facilitated in any suitable fashion (e.g., in SQL fashion, in SPARQL fashion, in GraphQL fashion, in Cypher fashion). In any case, such execution can yield the answer 1608. In various aspects, the answer 1608 can be any suitable electronic data (e.g., one or more scalars, one or more vectors, one or more matrices, one or more tensors, one or more character strings, or any suitable combination thereof) that can be considered as representing whatever information that was asked or requested in the structured query 1606 and thus in the natural language query 1602. As a non-limiting example, consider again the above instance where the natural language query 1602 can ask why the medical imaging scanner 104 is producing image artefacts. In such case, the answer 1608 can recite or identify one or more potential causes of imaging artefacts of the medical imaging scanner 104 that are enumerated in the knowledge graph 206. As another non-limiting example, consider again the above instance where the natural language query 1602 can ask what maintenance should be performed on the medical imaging scanner 104 or how often such maintenance should be performed. In such case, the answer 1608 can recite or identify one or more recommended maintenance tasks or maintenance schedules of the medical imaging scanner 104 that are enumerated in the knowledge graph 206.

In various aspects, the query component 116 can electronically render the answer 1608 on any suitable electronic display (e.g., screen) of the medical imaging scanner 104, so that the answer 1608 can be visible by the user or operator of the medical imaging scanner 104. In other instances, the query component 116 can electronically transmit the answer 1608 to any other suitable computing device (e.g., a smart phone) associated with the user or operator, so that the user or operator can become aware of the answer 1608.

Accordingly, as described herein, the knowledge graph construction system 102 can incrementally construct the knowledge graph 206 by iteratively executing the deep learning neural network 202 in RAG fashion on the design discovery tree 204, and the knowledge graph construction system 102 can subsequently leverage the knowledge graph 206 so as to answer real-world questions about the medical imaging scanner 104 that real-world users or operators might have.

Figure 18:
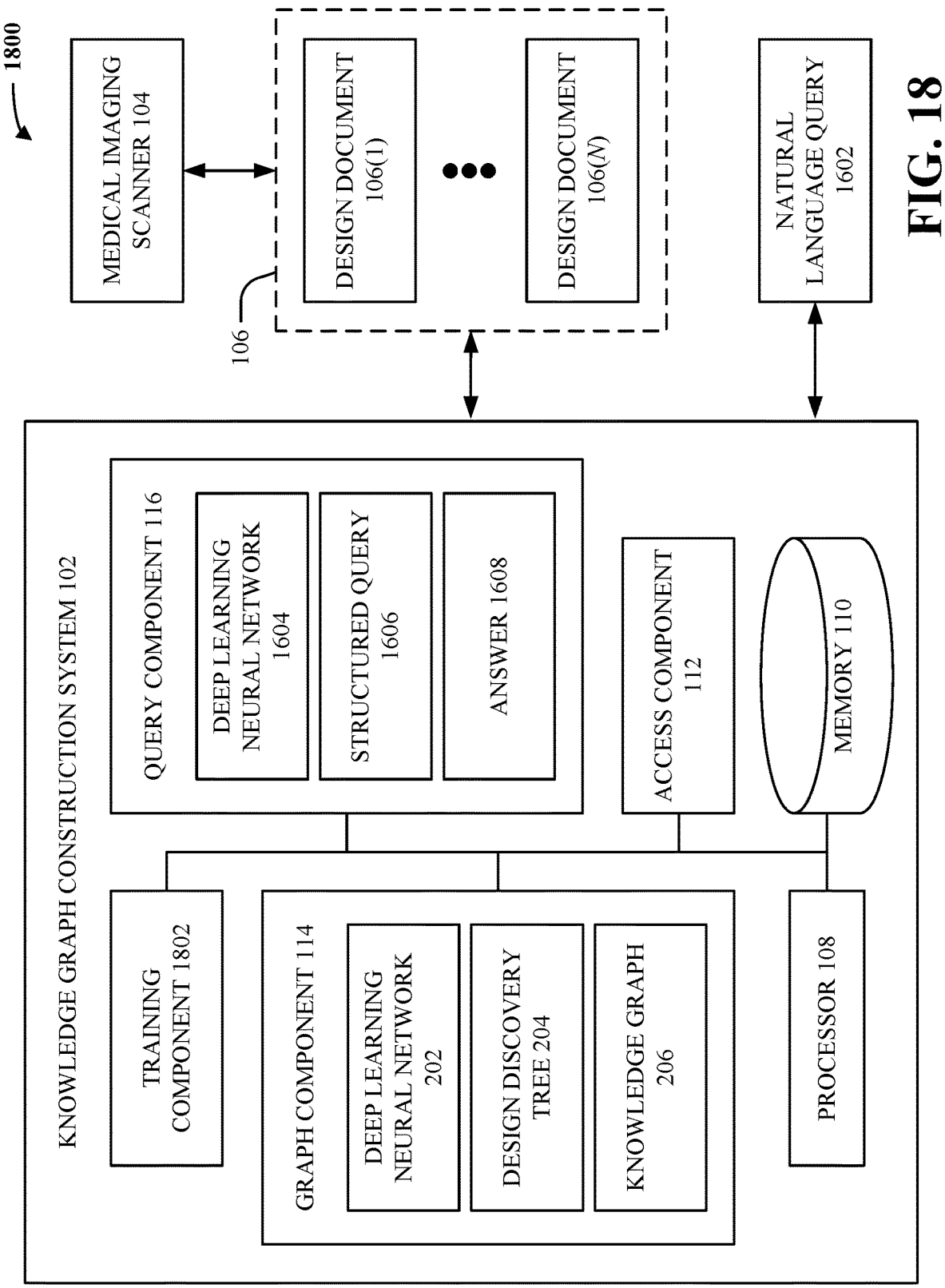
FIG. 18 illustrates a block diagram of an example, non-limiting system including a training component that facilitates knowledge graph construction via generative artificial intelligence in accordance with one or more embodiments described herein.
Figure 19:
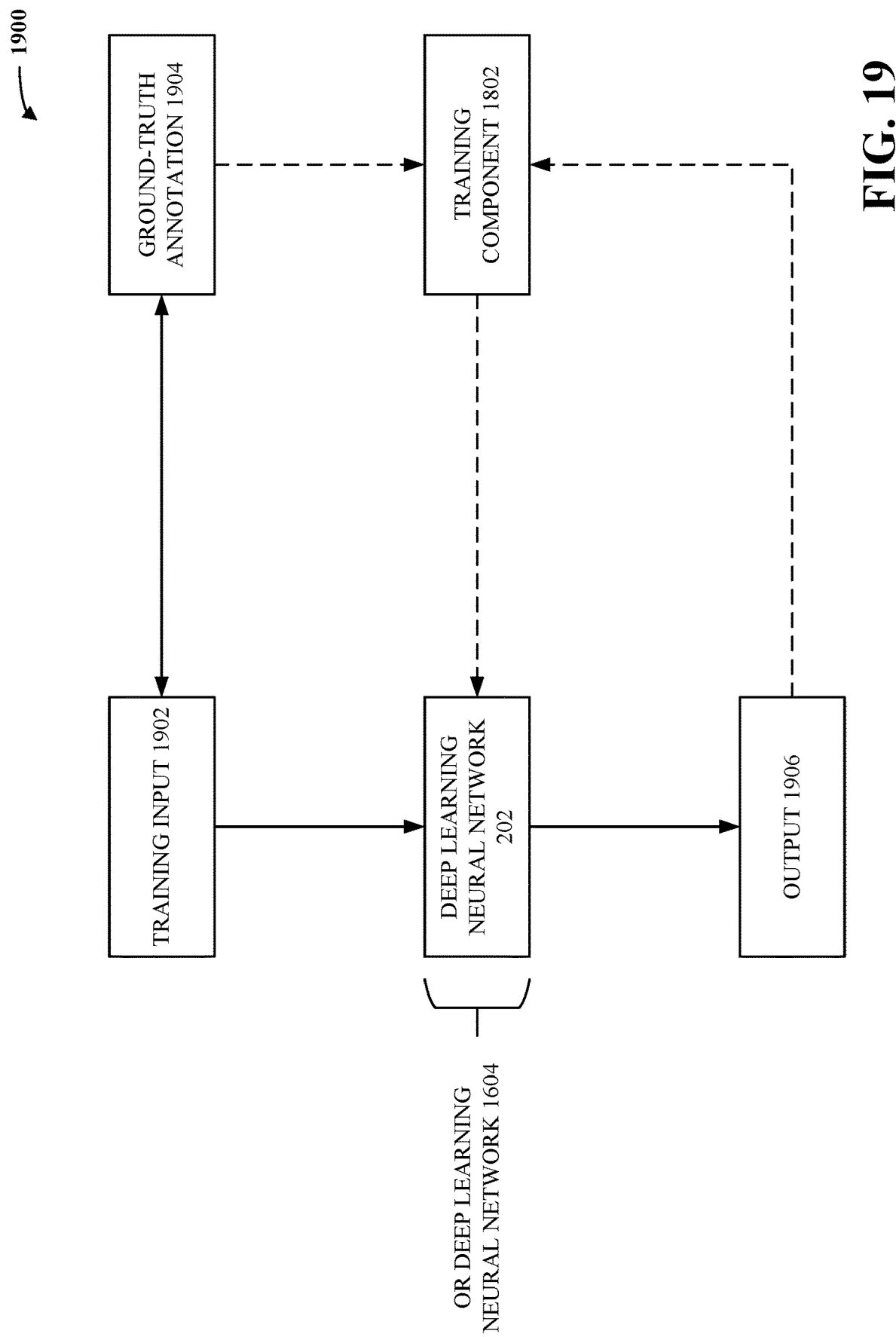
FIG. 19 illustrates an example, non-limiting block diagram showing how deep learning neural networks can be trained in accordance with one or more embodiments described herein.

In order for the knowledge graph construction system 102 to function accurately, correctly, or reliably, the deep learning neural network 202 and the deep learning neural network 1604 can first undergo training, as described with respect to FIGS. 18-19.

FIG. 18 illustrates a block diagram of an example, non-limiting system 1800 including a training component that can facilitate knowledge graph construction via generative artificial intelligence in accordance with one or more embodiments described herein. As shown, the system 1800 can, in some cases, comprise the same components as the system 1600, and can further comprise a training component 1802. In various instances, the training component 1802 can train the deep learning neural network 202 or the deep learning neural network 1604 using any suitable training paradigm. In some cases, such training can be facilitated in supervised fashion, as described with respect to FIG. 19.

FIG. 19 illustrates an example, non-limiting block diagram 1900 showing how deep learning neural networks can be trained in accordance with one or more embodiments described herein.

In various aspects, prior to beginning training, the training component 1802 can initialize in any suitable fashion (e.g., via random initialization) trainable internal parameters (e.g., convolutional kernels, weight matrices, bias values) of the deep learning neural network 202 (or of the deep learning neural network 1604).

In various embodiments, there can be a training input 1902 and a ground-truth annotation 1904. When it is desired to train the deep learning neural network 202, the training input 1902 can be a training textual prompt (or a concatenation of a training textual prompt with any suitable number of training relevant design documents), and the ground-truth annotation 1904 can be correct or accurate synthesized textual content that is known or deemed to correspond to the training input 1902. Instead, when it is desired to train the deep learning neural network 1604, the training input 1902 can be a training natural language query, and the ground-truth annotation 1904 can be a correct or accurate structured query that is known or deemed to correspond to the training input 1902.

In any case, the training component 1802 can execute the deep learning neural network 202 (or the deep learning neural network 1604) on the training input 1902, thereby causing the deep learning neural network 202 (or the deep learning neural network 1604) to produce an output 1906. More specifically, in some cases, the training component 1802 can feed or route the training input 1902 to the input layer of the deep learning neural network 202 (or of the deep learning neural network 1604), the training input 1902 can complete a forward pass through the one or more hidden layers of the deep learning neural network 202 (or of the deep learning neural network 1604), and the output layer of the deep learning neural network 202 (or of the deep learning neural network 1604) can compute the output 1906 based on activation maps or feature maps provided by the one or more hidden layers of the deep learning neural network 202 (or of the deep learning neural network 1604).

Note that the format, size, or dimensionality of the output 1906 can be dictated by the number, arrangement, sizes, or other characteristics of the neurons, convolutional kernels, or other internal parameters of the output layer (or of any other layers) of the deep learning neural network 202 (or of the deep learning neural network 1604). Accordingly, the output 1906 can be forced to have any desired format, size, or dimensionality, by adding, removing, or otherwise adjusting characteristics of the output layer (or of any other layers) of the deep learning neural network 202 (or of the deep learning neural network 1604).

In various aspects, if the output 1906 is produced by the deep learning neural network 202, the output 1906 can be considered as the predicted or inferred textual content that the deep learning neural network 202 has synthesized based on the training input 1902. On the other hand, if the output 1906 is produced by the deep learning neural network 1604, the output 1906 can be considered as the predicted or inferred structured query that the deep learning neural network 1604 believes should correspond to the training input 1902. In any case, the ground-truth annotation 1904 can be considered as whatever correct or accurate result (e.g., correct or accurate synthesized textual content, correct or accurate structured query) that is known or deemed to correspond to the training input 1902. Note that, if the deep learning neural network 202 (or the deep learning neural network 1604) has so far undergone no or little training, then the output 1906 can be highly inaccurate. In other words, the output 1906 can be very different from the ground-truth annotation 1904.

In various aspects, the training component 1802 can compute an error (e.g., mean absolute error (MAE), mean squared error (MSE), cross-entropy error) between the output 1906 and the ground-truth annotation 1904. In various instances, the training component 1802 can incrementally update the trainable internal parameters of the deep learning neural network 202 (or of the deep learning neural network 1604), via backpropagation (e.g., stochastic gradient descent) based on the computed error.

In various cases, such execution-and-update procedure can be repeated for any suitable number input-annotation pairs. This can ultimately cause the trainable internal parameters of the deep learning neural network 202 (or of the deep learning neural network 1604) to become iteratively optimized for accurately generating synthesized textual content (or structured queries). In various aspects, the training component 1802 can utilize any suitable training batch sizes, any suitable error/loss functions, or any suitable training termination criteria.

Although the herein disclosure mainly describes the deep learning neural network 202 and the deep learning neural network 1604 as being trained in supervised fashion, this is a mere non-limiting example for case of explanation and illustration. In various embodiments, any other suitable training paradigm can be used to train the deep learning neural network 202 and the deep learning neural network 1604, such as unsupervised training or reinforcement learning.

Figure 20:
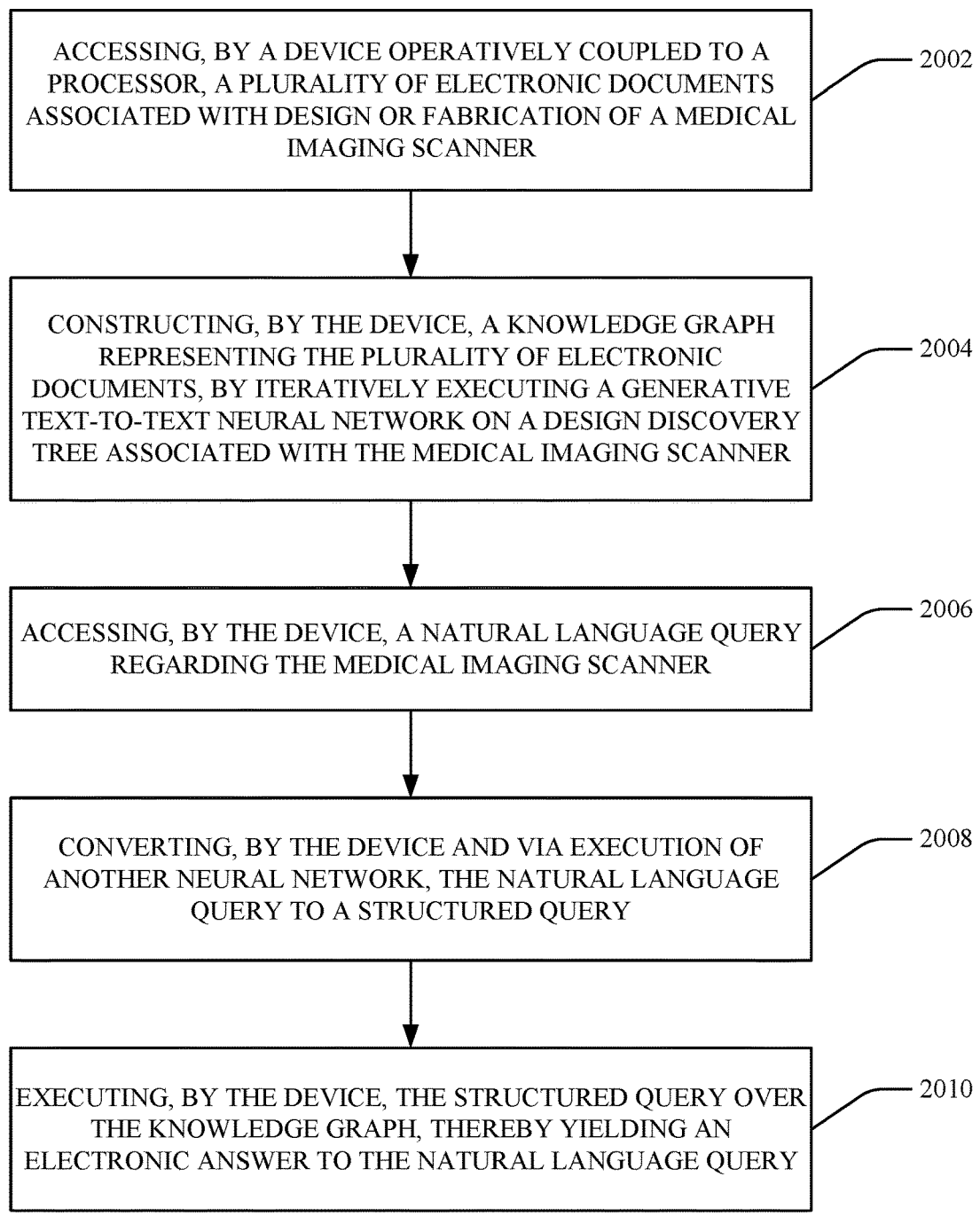
FIG. 20 illustrates a flow diagram of an example, non-limiting computer-implemented method that facilitates knowledge graph construction via generative artificial intelligence in accordance with one or more embodiments described herein.

FIG. 20 illustrates a flow diagram of an example, non-limiting computer-implemented method 2000 that can facilitate knowledge graph construction via generative artificial intelligence in accordance with one or more embodiments described herein. In various cases, the knowledge graph construction system 102 can facilitate the computer-implemented method 2000.

In various embodiments, act 2002 can include accessing, by a device (e.g., via 112) operatively coupled to a processor (e.g., 108), a plurality of electronic documents (e.g., 106) associated with design or fabrication of a medical imaging scanner (e.g., 104).

In various aspects, act 2004 can include constructing, by the device (e.g., via 114), a knowledge graph (e.g., 206) representing the plurality of electronic documents, by iteratively executing a generative text-to-text neural network (e.g., 202) on a design discovery trec (e.g., 204) associated with the medical imaging scanner.

In various instances, act 2006 can include accessing, by the device (e.g., via 112), a natural language query (e.g., 1602) regarding the medical imaging scanner.

In various cases, act 2008 can include converting, by the device (e.g., via 116) and via execution of another neural network (e.g., 1604), the natural language query to a structured query (e.g., 1606).

In various aspects, act 2010 can include executing, by the device (e.g., via 116), the structured query over the knowledge graph, thereby yielding an electronic answer (e.g., 1608) to the natural language query.

Although not explicitly shown in FIG. 20, for each element of the design discovery tree, the element can be a textual prompt (e.g., 308) requesting identification of a respective technical design detail (e.g., 310) of the medical imaging scanner.

Although not explicitly shown in FIG. 20, the textual prompt can have a known relation (e.g., 306) to another textual prompt (e.g., 302) of the design discovery tree.

Although not explicitly shown in FIG. 20, the computer-implemented method 2000 include: inserting, by the device (e.g., via 114), a node shell (e.g., 802) into the knowledge graph; appending, by the device (e.g., via 114), an instantiation of the known relation to the node shell; and filling, by the device (e.g., via 114), the node shell by executing the generative text-to-text neural network on the textual prompt in retrieval-augmented generative fashion. In various cases, the executing the generative text-to-text neural network on the textual prompt in retrieval-augmented generative fashion can comprise: identifying, by the device (e.g., via 114), one or more first electronic documents (e.g., 902) from the plurality of electronic documents that are relevant to the textual prompt; concatenating, by the device (e.g., via 114), the textual prompt with the one or more first electronic documents, thereby yielding a concatenation; and executing, by the device (e.g., via 114), the generative text-to-text neural network on the concatenation, thereby causing the generative text-to-text neural network to synthesize textual content (e.g., 1002) that describes the respective technical design detail of the medical imaging scanner. In various cases, the device (e.g., via 114) can fill the node shell with the textual content.

Although not explicitly shown in FIG. 20, the plurality of electronic documents can comprise: blueprints or schematics associated with the medical imaging scanner; or failure analysis reports associated with the medical imaging scanner.

Various embodiments have been described herein with respect to construction of knowledge graphs that contain technical information regarding medical imaging scanners. However, these are mere non-limiting examples. In various cases, various embodiments described herein can be applied or extrapolated to construct knowledge graphs for any suitable machines (e.g., are not limited just to constructing knowledge graphs for medical imaging scanners).

Indeed, various embodiments can involve a computer program product for facilitating knowledge graph construction via generative artificial intelligence. In various aspects, the computer program product can comprise a non-transitory computer-readable memory (e.g., 110) having program instructions embodied therewith. In various instances, the program instructions can be executable by a processor (e.g., 108) to cause the processor to: access a plurality of electronic documents (e.g., 106) associated with design or fabrication of a machine (e.g., 104); and construct a knowledge graph (e.g., 206) representing the plurality of electronic documents, by iteratively executing a generative text-to-text neural network (e.g., 202) on a design discovery tree (e.g., 204) associated with the machine. In various aspects, the program instructions can be further executable to cause the processor to: access a natural language query (e.g., 1602) regarding the machine; convert, via execution of another neural network (e.g., 1604), the natural language query to a structured query (e.g., 1606); and execute the structured query over the knowledge graph, thereby yielding an electronic answer (e.g., 1608) to the natural language query. In various instances, for each element of the design discovery tree, the element can be a textual prompt (e.g., 308) requesting identification of a respective technical design detail (e.g., 310) of the machine, and the textual prompt can have a known relation (e.g., 306) to another textual prompt of the design discovery tree. In various cases, the program instructions can be further executable to cause the processor to: insert a node shell (e.g., 802) into the knowledge graph; append an instantiation of the known relation to the node shell; and fill the node shell by executing the generative text-to-text neural network on the textual prompt in retrieval-augmented generative fashion.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(2)=$ confidence (class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 21:
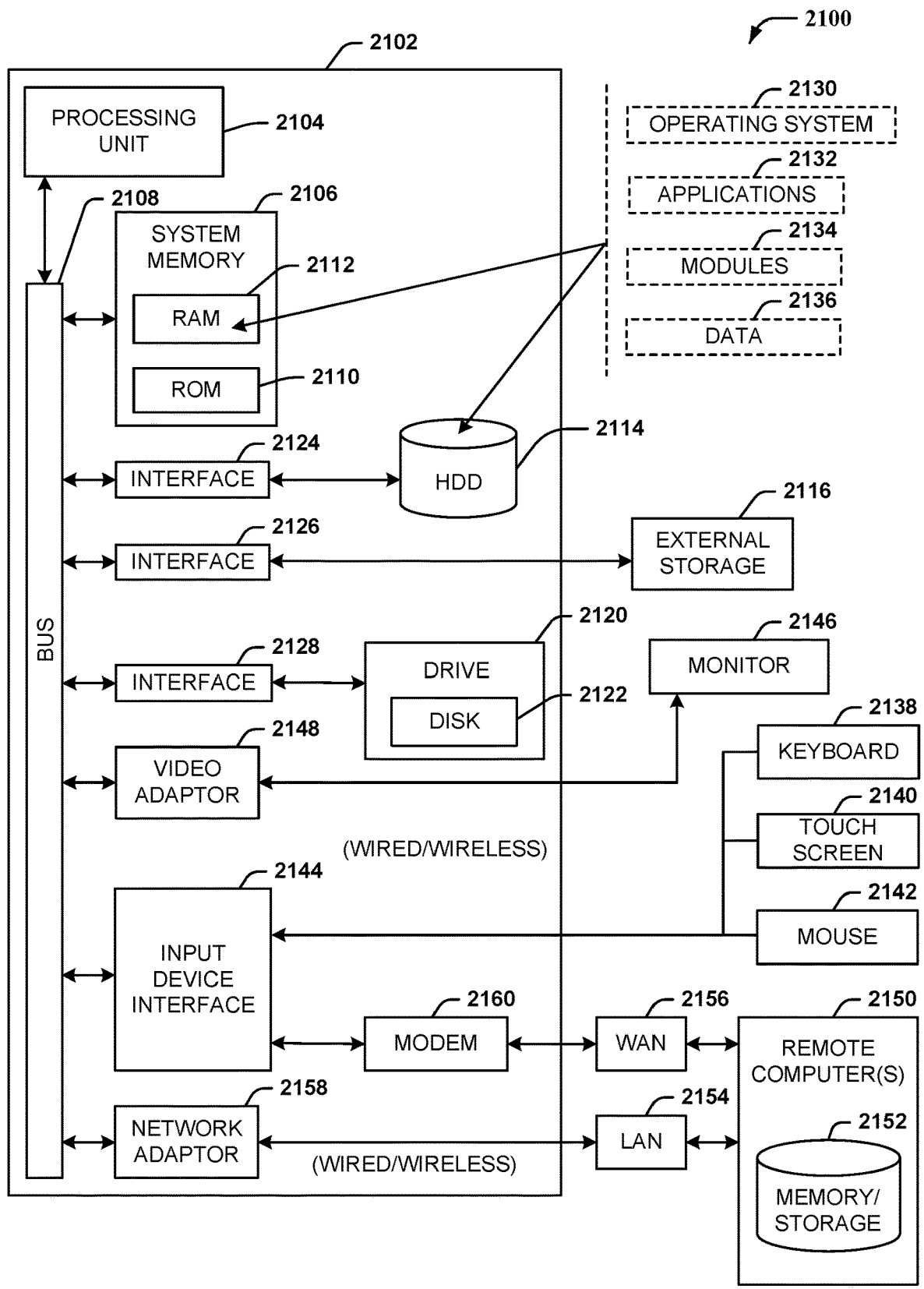
FIG. 21 illustrates a block diagram of an example, non-limiting operating environment in which one or more embodiments described herein can be facilitated.

In order to provide additional context for various embodiments described herein, FIG. 21 and the following discussion are intended to provide a brief, general description of a suitable computing environment 2100 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the aspects described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2114 (e.g., EIDE, SATA), one or more external storage devices 2116 (e.g., a magnetic floppy disk drive (FDD) 2116, a memory stick or flash drive reader, a memory card reader, etc.) and a drive 2120, e.g., such as a solid state drive, an optical disk drive, which can read or write from a disk 2122, such as a CD-ROM disc, a DVD, a BD, etc. Alternatively, where a solid state drive is involved, disk 2122 would not be included, unless separate. While the internal HDD 2114 is illustrated as located within the computer 2102, the internal HDD 2114 can also be configured for external use in a suitable chassis (not shown). Additionally, while not shown in environment 2100, a solid state drive (SSD) could be used in addition to, or in place of, an HDD 2114. The HDD 2114, external storage device(s) 2116 and drive 2120 can be connected to the system bus 2108 by an HDD interface 2124, an external storage interface 2126 and a drive interface 2128, respectively. The interface 2124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, or data can also be cached in the RAM 2112. The systems and methods described herein can be implemented utilizing various commercially available operating systems or combinations of operating systems.

Computer 2102 can optionally comprise emulation technologies. For example, a hypervisor (not shown) or other intermediary can emulate a hardware environment for operating system 2130, and the emulated hardware can optionally be different from the hardware illustrated in FIG. 21. In such an embodiment, operating system 2130 can comprise one virtual machine (VM) of multiple VMs hosted at computer 2102. Furthermore, operating system 2130 can provide runtime environments, such as the Java runtime environment or the .NET framework, for applications 2132. Runtime environments are consistent execution environments that allow applications 2132 to run on any operating system that includes the runtime environment. Similarly, operating system 2130 can support containers, and applications 2132 can be in the form of containers, which are lightweight, standalone, executable packages of software that include, e.g., code, runtime, system tools, system libraries and settings for an application.

Further, computer 2102 can be enable with a security module, such as a trusted processing module (TPM). For instance with a TPM, boot components hash next in time boot components, and wait for a match of results to secured values, before loading a next boot component. This process can take place at any layer in the code execution stack of computer 2102, e.g., applied at the application execution level or at the operating system (OS) kernel level, thereby enabling security at any level of code execution.

A user can enter commands and information into the computer 2102 through one or more wired/wireless input devices, e.g., a keyboard 2138, a touch screen 2140, and a pointing device, such as a mouse 2142. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2104 through an input device interface 2144 that can be coupled to the system bus 2108, but can be connected by other interfaces, such as a parallel port, an IEEE 1394 serial port, a game port, a USB port, an IR interface, a BLUETOOTH® interface, etc.

A monitor 2146 or other type of display device can be also connected to the system bus 2108 via an interface, such as a video adapter 2148. In addition to the monitor 2146, a computer typically includes other peripheral output devices (not shown), such as speakers, printers, etc.

The computer 2102 can operate in a networked environment using logical connections via wired or wireless communications to one or more remote computers, such as a remote computer(s) 2150. The remote computer(s) 2150 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2152 is illustrated. The logical connections depicted include wired/wireless connectivity to a local area network (LAN) 2154 or larger networks, e.g., a wide area network (WAN) 2156. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2154 through a wired or wireless communication network interface or adapter 2158. The adapter 2158 can facilitate wired or wireless communication to the LAN 2154, which can also include a wireless access point (AP) disposed thereon for communicating with the adapter 2158 in a wireless mode.

When used in a WAN networking environment, the computer 2102 can include a modem 2160 or can be connected to a communications server on the WAN 2156 via other means for establishing communications over the WAN 2156, such as by way of the Internet. The modem 2160, which can be internal or external and a wired or wireless device, can be connected to the system bus 2108 via the input device interface 2144. In a networked environment, program modules depicted relative to the computer 2102 or portions thereof, can be stored in the remote memory/storage device 2152. It will be appreciated that the network connections shown are example and other means of establishing a communications link between the computers can be used.

When used in either a LAN or WAN networking environment, the computer 2102 can access cloud storage systems or other network-based storage systems in addition to, or in place of, external storage devices 2116 as described above, such as but not limited to a network virtual machine providing one or more aspects of storage or processing of information. Generally, a connection between the computer 2102 and a cloud storage system can be established over a LAN 2154 or WAN 2156 e.g., by the adapter 2158 or modem 2160, respectively. Upon connecting the computer 2102 to an associated cloud storage system, the external storage interface 2126 can, with the aid of the adapter 2158 or modem 2160, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 22:
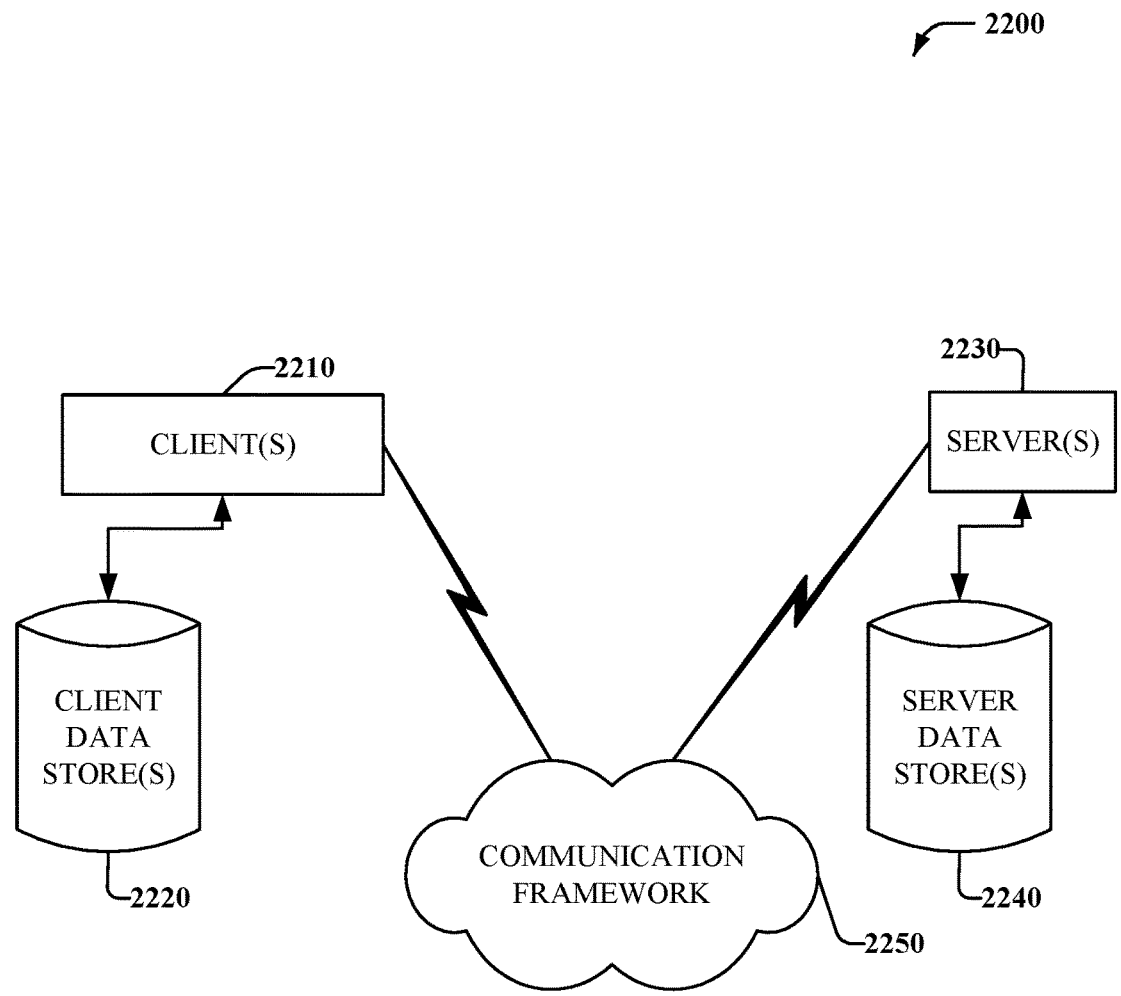
FIG. 22 illustrates an example networking environment operable to execute various implementations described herein.

FIG. 22 is a schematic block diagram of a sample computing environment 2200 with which the disclosed subject matter can interact. The sample computing environment 2200 includes one or more client(s) 2210. The client(s) 2210 can be hardware or software (e.g., threads, processes, computing devices). The sample computing environment 2200 also includes one or more server(s) 2230. The server(s) 2230 can also be hardware or software (e.g., threads, processes, computing devices). The servers 2230 can house threads to perform transformations by employing one or more embodiments as described herein, for example. One possible communication between a client 2210 and a server 2230 can be in the form of a data packet adapted to be transmitted between two or more computer processes. The sample computing environment 2200 includes a communication framework 2250 that can be employed to facilitate communications between the client(s) 2210 and the server(s) 2230. The client(s) 2210 are operably connected to one or more client data store(s) 2220 that can be employed to store information local to the client(s) 2210. Similarly, the server(s) 2230 are operably connected to one or more server data store(s) 2240 that can be employed to store information local to the servers 2230.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable components stored in a non-transitory computer-readable memory, wherein the computer-executable components comprise:
      an access component that accesses a plurality of domain-specific technical electronic documents associated with design or fabrication of a medical imaging;
      a graph component that constructs a knowledge graph representing the plurality of electronic documents, by iteratively executing a retrieval-augmented generative (RAG) text-to-text neural network, wherein:
         (a) the neural network operates on a hierarchically-structured design discovery tree, each node of which is associated with a predefined textual prompt requesting a technical design detail; and
         (b) the neural network synthesizes textual content for populating the knowledge graph nodes, based on concatenation of the textual prompt and one or more relevant documents retrieved from the plurality of electronic documents; wherein the computer-executable components further comprise: a query component that converts, via execution of a second neural network, a natural language query into a structured query; and executes the structured query over the knowledge graph to generate an electronic answer to the natural language query.

2. The system of claim 1, wherein the access component accesses a natural language query regarding the medical imaging scanner, and wherein the computer-executable components further comprise:
a query component that converts, via execution of another neural network, the natural language query to a structured query and that executes the structured query over the knowledge graph, thereby yielding an electronic answer to the natural language query.

3. The system of claim 1, wherein, for each element of the design discovery tree, the element is a textual prompt requesting identification of a respective technical design detail of the medical imaging scanner.

4. The system of claim 3, wherein the textual prompt has a known relation to another textual prompt of the design discovery tree.

5. The system of claim 4, wherein the graph component inserts a node shell into the knowledge graph, appends an instantiation of the known relation to the node shell, and fills the node shell by executing the generative text-to-text neural network on the textual prompt in retrieval-augmented generative fashion.

6. The system of claim 5, wherein the graph component executes the generative text-to-text neural network on the textual prompt in retrieval-augmented generative fashion by:
identifying one or more first electronic documents from the plurality of electronic documents that are relevant to the textual prompt;
concatenating the textual prompt with the one or more first electronic documents, thereby yielding a concatenation; and
executing the generative text-to-text neural network on the concatenation, thereby causing the generative text-to-text neural network to synthesize textual content that describes the respective technical design detail of the medical imaging scanner.

7. The system of claim 6, wherein the graph component fills the node shell with the textual content.

8. The system of claim 1, wherein the plurality of electronic documents comprise domain-specific technical documents including at least one of: blueprints, schematics; or failure analysis reports associated with the medical imaging scanner.

9. A computer-implemented method, comprising:
accessing, by a device operatively coupled to a processor, a plurality of electronic domain-specific technical documents associated with design or fabrication of a medical imaging scanner;
constructing, by the device, a knowledge graph representing the plurality of electronic documents, by iteratively executing a retrieval-augmented generative (RAG) text-to-text neural network, wherein the neural network operates on a hierarchically-structured design discovery tree with predefined prompts and synthesizes content using concatenated prompt-document pairs.

10. The computer-implemented method of claim 9, further comprising:
accessing, by the device, a natural language query regarding the medical imaging scanner;
converting, by the device and via execution of another neural network, the natural language query to a structured query; and
executing, by the device, the structured query over the knowledge graph, thereby yielding an electronic answer to the natural language query.

11. The computer-implemented method of claim 9, wherein, for each element of the design discovery tree, the element is a textual prompt requesting identification of a respective technical design detail of the medical imaging scanner.

12. The computer-implemented method of claim 11, wherein the textual prompt has a known relation to another textual prompt of the design discovery tree.

13. The computer-implemented method of claim 12, further comprising:
inserting, by the device, a node shell into the knowledge graph;
appending, by the device, an instantiation of the known relation to the node shell; and
filling, by the device, the node shell by executing the generative text-to-text neural network on the textual prompt in retrieval-augmented generative fashion.

14. The computer-implemented method of claim 13, wherein the executing the generative text-to-text neural network on the textual prompt in retrieval-augmented generative fashion comprises:
identifying, by the device, one or more first electronic documents from the plurality of electronic documents that are relevant to the textual prompt;
concatenating, by the device, the textual prompt with the one or more first electronic documents, thereby yielding a concatenation; and
executing, by the device, the generative text-to-text neural network on the concatenation, thereby causing the generative text-to-text neural network to synthesize textual content that describes the respective technical design detail of the medical imaging scanner.

15. The computer-implemented method of claim 14, wherein the device fills the node shell with the textual content.

16. The computer-implemented method of claim 9, wherein the plurality of electronic documents comprise: blueprints or schematics associated with the medical imaging scanner; or failure analysis reports associated with the medical imaging scanner.

17. A computer program product for facilitating knowledge graph construction via generative artificial intelligence, the computer program product comprising a non-transitory computer-readable memory having program instructions embodied therewith, the program instructions executable by a processor to cause the processor to:
access a plurality of domain-specific technical electronic documents associated with design or fabrication of a machine; and
construct a knowledge graph representing the plurality of electronic documents by iteratively executing a retrieval-augmented generative (RAG) text-to-text neural network, wherein:
(a) the neural network operates on a hierarchically-structured design discovery tree, each node of which is associated with a predefined textual prompt requesting a technical design detail; and
(b) the neural network synthesizes textual content to populate the knowledge graph nodes, based on a concatenation of the prompt and one or more relevant documents retrieved from the plurality of electronic documents.

18. The computer program product of claim 17, wherein the program instructions are further executable to cause the processor to:
   access a natural language query regarding the machine;
   convert, via execution of another neural network, the natural language query to a structured query; and
   execute the structured query over the knowledge graph, thereby yielding an electronic answer to the natural language query.

19. The computer program product of claim 17, wherein, for each element of the design discovery tree, the element is a textual prompt requesting identification of a respective technical design detail of the machine, and wherein the textual prompt has a known relation to another textual prompt of the design discovery tree.

20. The computer program product of claim 19, wherein the program instructions are further executable to cause the processor to:
   insert a node shell into the knowledge graph;
   append an instantiation of the known relation to the node shell; and
   fill the node shell by executing the generative text-to-text neural network on the textual prompt in retrieval-augmented generative fashion.

21. The system of claim 1, wherein the structured query is in a formal query language selected from: SQL, SPARQL, or Cypher.

22. The system of claim 1, wherein the retrieval-augmented generative neural network is trained in a domain-agnostic manner and constructs knowledge graphs for a plurality of unrelated technical domains without retraining.

23. The method of claim 9, wherein the structured query is in a formal query language selected from: SQL, SPARQL, or Cypher.

24. The method of claim 9, further comprising: generating the knowledge graph in less time or with fewer compute resources compared to a rule-based or domain-specific training-based system.

* * * * *